US012675884B2

(12) United States Patent
Asano et al.

(10) Patent No.: US 12,675,884 B2
(45) Date of Patent: Jul. 7, 2026

(54) GAS MIGRATION ESTIMATION DEVICE, GAS MIGRATION ESTIMATION METHOD, ESTIMATION MODEL GENERATION DEVICE, ESTIMATION MODEL GENERATION METHOD, AND PROGRAM

(71) Applicant: KONICA MINOLTA, INC., Tokyo (JP)

(72) Inventors: Motohiro Asano, Osaka (JP); Takashi Morimoto, Suita (JP); Shunsuke Takamura, Tama (JP)

(73) Assignee: KONICA MINOLTA, INC., Tokyo (JP)

( * ) Notice: Subject to any disclaimer, the term of this patent is extended or adjusted under 35 U.S.C. 154(b) by 523 days.

(21) Appl. No.: 18/008,175

(22) PCT Filed: May 20, 2021

(86) PCT No.: PCT/JP2021/019125
§ 371 (c)(1),
(2) Date: Dec. 4, 2022

(87) PCT Pub. No.: WO2021/246185
PCT Pub. Date: Dec. 9, 2021

(65) Prior Publication Data
US 2023/0274443 A1    Aug. 31, 2023

(30) Foreign Application Priority Data
Jun. 5, 2020    (JP) ................................. 2020-098115

(51) Int. Cl.
*G06K 9/00*        (2022.01)
*G01M 3/04*        (2006.01)
*G06T 7/20*        (2017.01)

(52) U.S. Cl.
CPC ................. *G06T 7/20* (2013.01); *G01M 3/04* (2013.01); *G06T 2207/10016* (2013.01);
(Continued)

(58) Field of Classification Search
None
See application file for complete search history.

(56) References Cited

U.S. PATENT DOCUMENTS 10,948,471 B1 *   3/2021   MacMullin ........ G01N 33/0047
2019/0096211 A1   3/2019   Stadler
(Continued)

FOREIGN PATENT DOCUMENTS

JP        H11326008 A      11/1999
JP        2004086428 A      3/2004
(Continued)

OTHER PUBLICATIONS

International Search Report (ISR) (and English language translation thereof) dated Jul. 20, 2021 issued in International Application No. PCT/JP2021/019125.
Written Opinion (and English language translation thereof) dated Jul. 20, 2021 issued in International Application No. PCT/JP2021/019125.

*Primary Examiner* — Wei Wen Yang
(74) *Attorney, Agent, or Firm* — Holtz, Holtz & Volek PC

(57) ABSTRACT

An estimation device and an estimation method are capable of detecting whether or not gas is flowing in a distal-proximal direction from a viewpoint even in a case where gas monitoring is performed on the basis of only an image from one viewpoint. The gas migration estimation device includes: an image input unit that receives, as an input, a gas distribution moving image in which a presence range of gas leaked into a space is indicated as a gas region; and a gas migration estimation unit that estimates a migration state of gas in a distal-proximal direction corresponding to the gas distribution moving image received by the image acquisition
(Continued)

unit, by using an estimation model that is machine-learned using a combination of a training gas distribution moving image and a migration state of gas in a distal-proximal direction in the training gas distribution moving image as training data.

21 Claims, 19 Drawing Sheets

(52) U.S. Cl.
CPC ............... *G06T 2207/10024* (2013.01); *G06T 2207/10048* (2013.01); *G06T 2207/20076* (2013.01); *G06T 2207/20081* (2013.01)

(56) References Cited

U.S. PATENT DOCUMENTS

| | | | |
|---|---|---|---|
| 2019/0228329 A1 | 7/2019 | Utsumi et al. | |
| 2020/0082536 A1 | 3/2020 | Asano | |
| 2020/0320659 A1* | 10/2020 | Whiting | G01M 3/38 |
| 2021/0232741 A1 | 7/2021 | Ogiso et al. | |

FOREIGN PATENT DOCUMENTS

| | | |
|---|---|---|
| JP | 2018163515 A | 10/2018 |
| JP | 2020063955 A | 4/2020 |
| WO | 2018203480 A1 | 11/2018 |

* cited by examiner

GAS REGION
MOVING IMAGE
FRAME

−188.3pix/sec

+188.3pix/sec

−188.3pix/sec

+188.3pix/sec

GAS MIGRATION ESTIMATION DEVICE, GAS MIGRATION ESTIMATION METHOD, ESTIMATION MODEL GENERATION DEVICE, ESTIMATION MODEL GENERATION METHOD, AND PROGRAM

TECHNICAL FIELD

The present disclosure relates to a device, a system, a method, and a program for identifying migration of a leaked gas in a method for sensing the leaked gas in a space using an image.

BACKGROUND ART

Gas plants, petrochemical plants, thermal power plants, ironmaking-related facilities, and the like handle a large amount of gas at the time of operation. In such facilities, a risk of gas leakage due to aged deterioration or an operation error of the facilities is recognized, and a gas sensing device is provided to minimize the gas leakage before a major accident occurs. In recent years, in addition to a gas sensing device using the fact that electrical characteristics of a sensing probe are changed by contact of gas molecules with the probe, a gas visualization imaging device using infrared absorption by gas has been introduced.

The gas visualization imaging device senses the presence of gas by capturing a change in the amount of electromagnetic waves generated when electromagnetic waves mainly in the infrared region, which is called black-body radiation emitted from a background object having an absolute temperature of 0 K or more, are absorbed by the gas or when black-body radiation is generated from the gas itself. Since the gas leakage can be captured as an image by capturing a monitoring target space with the gas visualization imaging device, the gas leakage can be sensed earlier and the location of the presence of the gas can be accurately captured as compared with a sensing probe type that can only monitor a grid point-like location.

CITATION LIST

Patent Literature

Patent Literature 1: JP 11-326008 A

SUMMARY OF INVENTION

Technical Problem

Even when a valve or the like is operated in a case where gas leakage occurs, there is a possibility that the gas present between the valve or the like and the leakage source continuously leaks out, and there is a possibility that the already leaked gas stays in a space near the leakage source. Therefore, in a case where it is necessary for a person to check a facility state, repair, or the like, it is preferable to move while avoiding a place where the gas concentration is high, and in a case where gas is flowing, it is preferable to approach from the windward side while avoiding the leeward side. However, with the gas visualization imaging device based on the image from one viewpoint, the migration of the gas in the direction in which the orientation from the imaging viewpoint changes (the left-right direction and the up-down direction of the image) can be easily captured, but it is difficult to capture the migration of the gas in a distal-proximal direction (depth direction of the image) from the imaging viewpoint. For example, there is a method of observing from multiple viewpoints using a mirror as in the technology disclosed in Patent Literature 1, but it cannot be applied in a case where the mirror cannot be arranged.

In view of the above problems, an object of an aspect of the present disclosure is to provide an estimation device and an estimation method capable of detecting whether or not gas is flowing in a distal-proximal direction from a viewpoint even in a case where gas monitoring is performed on the basis of only an image from one viewpoint.

Solution to Problem

A gas migration estimation device according to one aspect of the present disclosure includes: an image input unit that receives, as an input, a gas distribution moving image including a plurality of frames and in which a presence range of gas leaked into a space is indicated as a gas region; and a gas migration estimation unit that estimates a migration state of gas in a distal-proximal direction corresponding to the gas distribution moving image received by the image acquisition unit, by using an estimation model that is machine-learned using a combination of a training gas distribution moving image and a migration state of gas in a distal-proximal direction in the training gas distribution moving image as training data.

Advantageous Effects of Invention

According to the above aspect, the migration state of the gas in the distal-proximal direction is estimated on the basis of a feature of a gas region in a gas distribution moving image. Therefore, by appropriately designing training data, it is possible to identify whether the gas is approaching or moving away with respect to an imaging position.

DESCRIPTION OF EMBODIMENTS

First Embodiment

The gas sensing system 100 according to the first embodiment will be described below with reference to the drawings.

Figure 1:
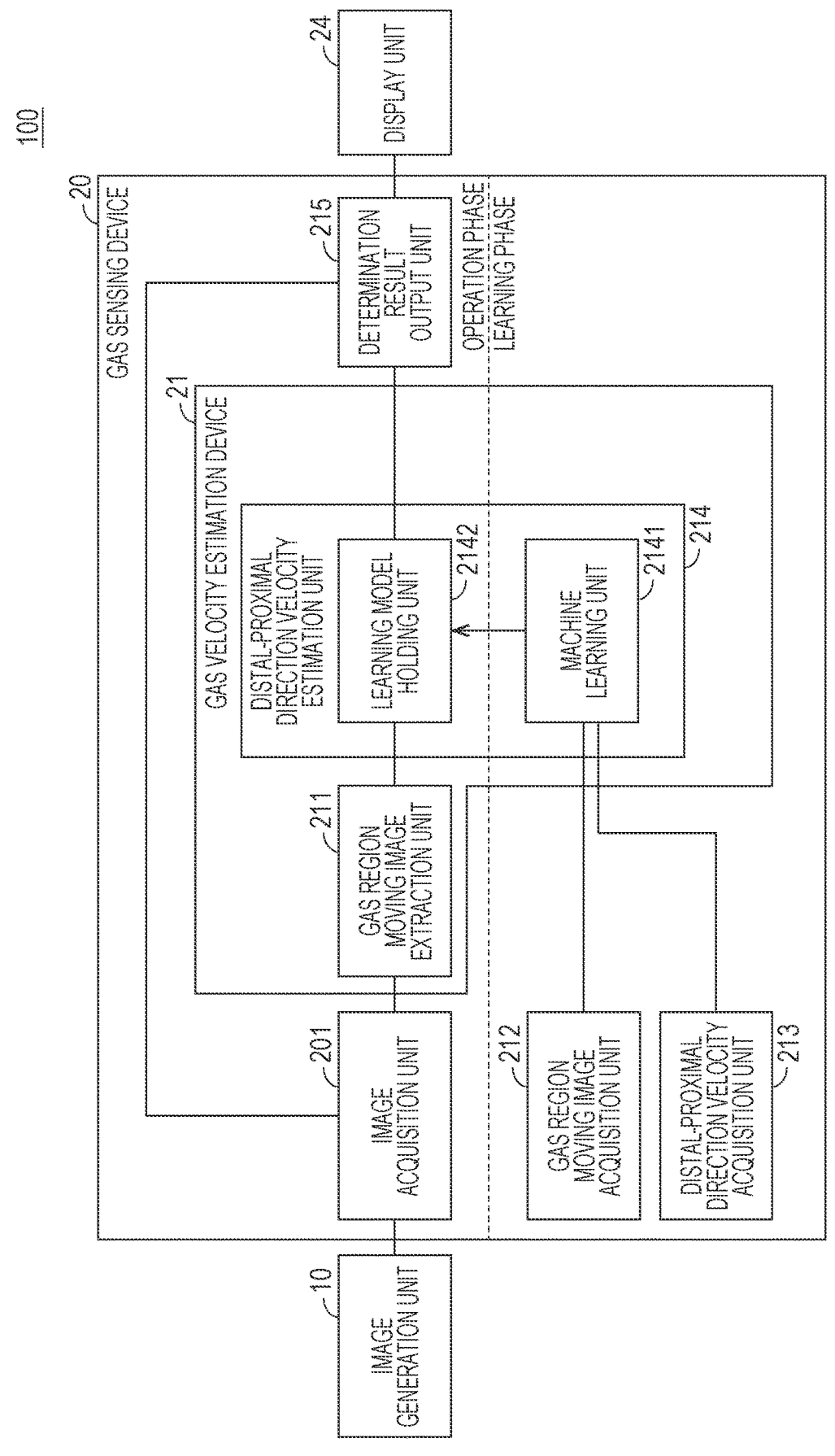
FIG. 1 is a function block diagram of a gas sensing system 100 according to a first embodiment.

FIG. 1 is a function block diagram of the gas sensing system 100 according to the first embodiment. As illustrated in FIG. 1, the gas sensing system 100 includes the image generation unit 10 for capturing an image of a monitoring target, the gas sensing device 20 that senses gas on the basis of the image acquired by the image generation unit 10, and a display unit 24. The image generation unit 10 and the display unit 24 are each configured to be connectable to the gas sensing device 20.

<Image Generation Unit 10>

The image generation unit 10 is a device or system that captures an image of a monitoring target and provides the gas sensing device 20 with the image. In the first embodiment, the image generation unit 10 is, for example, a so-called infrared camera that senses and images infrared light having a wavelength of 3.2 to 3.4 μm, and can sense hydrocarbon-based gases such as methane, ethane, ethylene, and propylene. Note that the image generation unit 10 is not limited thereto, and it is sufficient if it is an imaging device capable of sensing a monitoring target gas, and for example, the image generation unit 10 may be a general visible light camera as long as the monitoring target is a gas capable of being sensed by visible light such as water vapor turning into white smoke. Note that, in the present specification, the gas refers to a gas that has leaked from a closed space such as a pipe or a tank and has not been intentionally diffused into the atmosphere.

Figure 2:
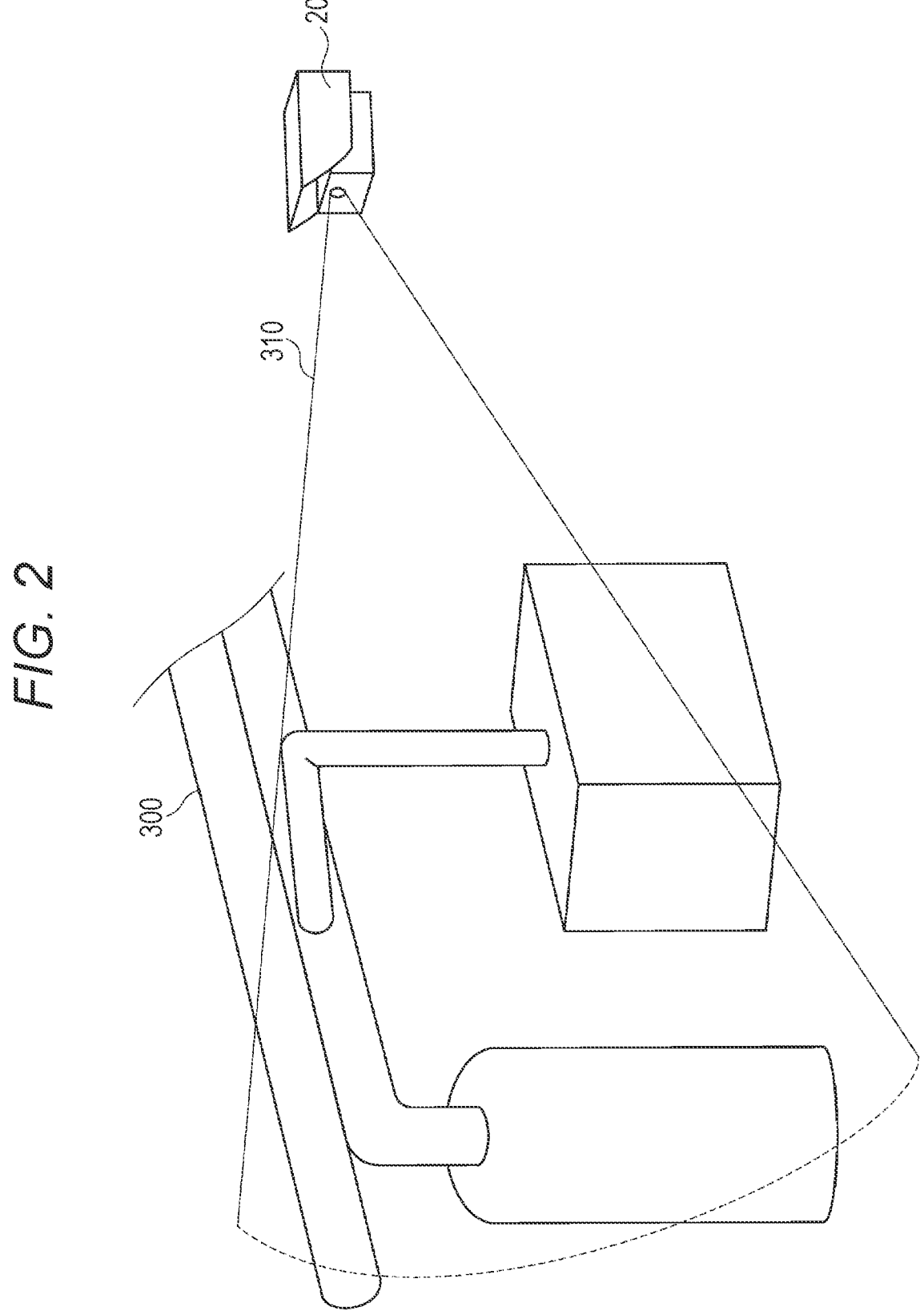
FIG. 2 is a perspective diagram illustrating a relationship between a monitoring target 300 and an image generation unit 10.

As illustrated in the schematic diagram of FIG. 2, the image generation unit 10 is installed such that the monitoring target 300 is included in a visual field range 310 of the image generation unit 10. The image generation unit 10 outputs the captured image as a video signal to the gas sensing device 20. The video signal is, for example, a signal for transmitting an image of 30 frames per second.

<Configuration of Gas Sensing Device 20>

The gas sensing device 20 is a device that acquires the image obtained by capturing the image of the monitoring target from the image generation unit 10, detects a gas region on the basis of the image, and notifies a user of gas sensing through the display unit 24. The gas sensing device 20 is implemented as a computer including, for example, a general central processing unit (CPU) and random access memory (RAM), and a program executed by them.

Note that, as described below, the gas sensing device 20 may further include a graphics processing unit (GPU), which is an arithmetic device, and RAM. As illustrated in FIG. 1, the gas sensing device 20 includes an image acquisition unit 201, a gas region moving image extraction unit 211, a gas region moving image acquisition unit 212, a distal-proximal direction velocity acquisition unit 213, a machine learning unit 2141, a learning model holding unit 2142, and a determination result output unit 215. The gas region moving image extraction unit 211 has the function of the image acquisition unit of the present disclosure. Furthermore, the machine learning unit 2141 and the learning model holding unit 2142 constitute a distal-proximal direction velocity estimation unit 214. The gas region moving image extraction unit 211 and the distal-proximal direction velocity estimation unit 214 constitute a gas velocity estimation device 21.

The image acquisition unit 201 is an acquisition unit that acquires a moving image obtained by capturing the image of the monitoring target from the image generation unit 10. In the embodiment, the image acquisition unit 201 acquires the video signal from the image generation unit 10, restores the video signal to an image, and outputs the image to the gas region moving image extraction unit 211 as a moving image including a plurality of frames. The image is an infrared photograph obtained by capturing the image of the monitoring target, and has infrared intensity as a pixel value.

Figure 4A:
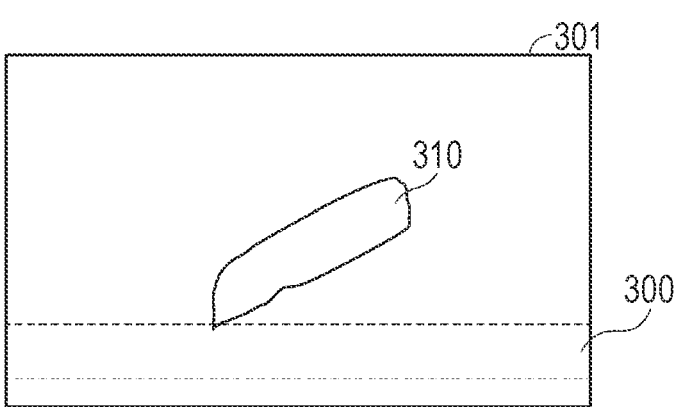
FIGS. 4A, 4B, and 4C are schematic diagrams illustrating a process of generating a gas distribution moving image from a captured image.
Figure 4B:
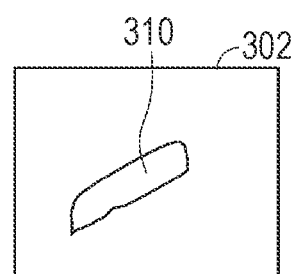
Figure 4C:
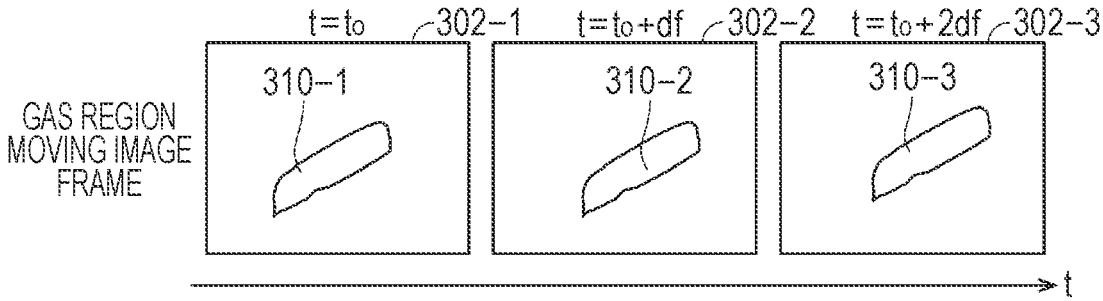

The gas region moving image extraction unit 211 is an image processing unit that performs gas sensing processing on the moving image output by the image acquisition unit 201 and generates a gas distribution moving image including the gas region. A known method can be used for the gas sensing processing. Specifically, for example, a method described in WO 2017/073440 A (Patent Literature 1) can be used. Then, a gas distribution moving image is generated as a moving image obtained by cutting out a region including the gas region from each frame of the moving image. Specifically, in a case where the gas leaked from a facility is imaged in the image generation unit 10, a gas region 310 corresponding to the gas is imaged as illustrated in a frame example 301 in FIG. 4A. Here, an image 300 of the facility is not drawn in the image. Therefore, in each frame of the gas distribution moving image, an image including the gas region 310 is generated as illustrated in a frame example 302 illustrated in FIG. 4B. Therefore, as illustrated in FIG. 4C, the gas distribution moving image includes a plurality of frames 302-*n* acquired in time series. Note that the gas region moving image extraction unit 211 may perform processing such as gain adjustment after cutting out a region including the gas region from each frame of the moving image. Furthermore, only a specific frequency component may be extracted by the method described in Patent Literature 1 instead of the pixel value itself of the moving image. By this processing, high frequency noise and low frequency noise such as an overall temperature change in space can be removed.

Figure 5A:
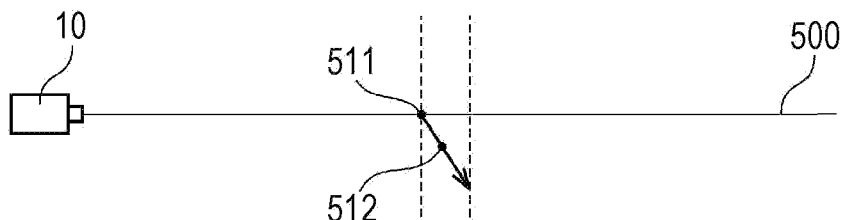
FIGS. 5A and 5B are schematic overhead diagrams for describing a relationship between a temporal change tendency of a gas region in a gas distribution moving image and a gas flow velocity in a distal-proximal direction.
Figure 5A:
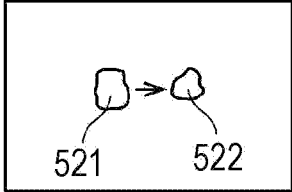

Here, the frames constituting the gas distribution moving image are extracted at the same scale from the same coordinate range of each frame of the original moving image so that the spatial positions indicated by the pixels are the same. That is, temporal and spatial changes in the size of a gas cloud is regarded as a change in the angle of view due to the changes, and are reflected as a change in the size of the gas region. Therefore, as illustrated in the schematic overhead diagram of FIG. 5A, in a case where the gas cloud flows

Figure 5B:
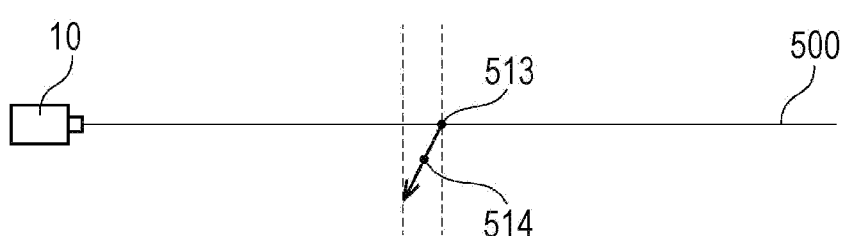
Figure 5B:
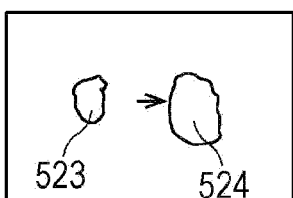

5 away from the image generation unit 10, when the gas cloud at a position 511 migrates to a position 512, the position 512 is farther from the image generation unit 10 than the position 511 and the gas cloud appears smaller when the dimension is the same, and thus, an image 522 of the gas cloud at the position 512 appears smaller than an image 521 of the gas cloud at the position 511 unless the size of the gas cloud changes, and the enlargement width becomes smaller even when the gas cloud expands. On the other hand, since the total amount of gas contained in the gas cloud has not changed significantly, the concentration of the gas cloud is the same or decreases in inverse proportion to the area of the gas cloud, but the degree thereof is small. On the other hand, as illustrated in the schematic overhead diagram of FIG. 5B, in a case where the gas cloud flows to approach the image generation unit 10, when the gas cloud at a position 513 migrates to a position 514, the position 514 is closer to the image generation unit 10 than the position 513 and the gas cloud appears larger when the dimension is the same, and thus, an image 524 of the gas cloud at the position 514 appears larger than an image 523 of the gas cloud at the position 513 even when the size of the gas cloud does not change, and the enlargement width becomes larger when the gas cloud expands. On the other hand, since the total amount of gas contained in the gas cloud has not changed significantly, the concentration of the gas cloud decreases in inverse proportion to the area of the gas cloud, and the degree thereof is large. Therefore, the expansion of the gas region and the change in the concentration are feature amounts indicating the gas flow in the distal-proximal direction of the gas.

Note that when the size of the gas distribution moving image or the number of frames as the moving image is excessive, the machine learning and the calculation amount of determination based on the machine learning increase. In the first embodiment, the number of pixels of the gas distribution moving image is 224×224 pixels, the frame rate is five frames per second, and the number of frames is 16.

The gas region moving image acquisition unit 212 is an acquisition unit that acquires an image that is a gas distribution moving image having the same format as the gas distribution moving image generated by the gas region moving image extraction unit 211 and in which the scale of the image and the flow velocity (component) of the gas, which is a subject, in the distal-proximal direction as viewed from the imaging viewpoint are known. Here, the flow velocity (component) of the gas can be calculated using, for example, the wind speed and the wind direction at the time point of imaging. Note that, in a case where the acquired image does not have the same format as the gas distribution moving image generated by the gas region moving image extraction unit 211, the gas region moving image acquisition unit 212 may perform processing such as cutting and gain adjustment so as to have the same format.

The distal-proximal direction velocity acquisition unit 213 is an acquisition unit that acquires a flow velocity component of the gas in the distal-proximal direction as viewed from the imaging viewpoint corresponding to the gas region of the gas distribution moving image acquired by the gas region moving image acquisition unit 212. The flow velocity component of the gas is designated as a relative value with respect to the flow velocity component of the gas in the orientation (orientation in which viewing angle changes, viewing angle direction) orthogonal to the distal-proximal direction. The orientation orthogonal to the distal-proximal direction corresponds to the X direction, the Y direction, or the combined direction thereof of the gas

Figure 6A:
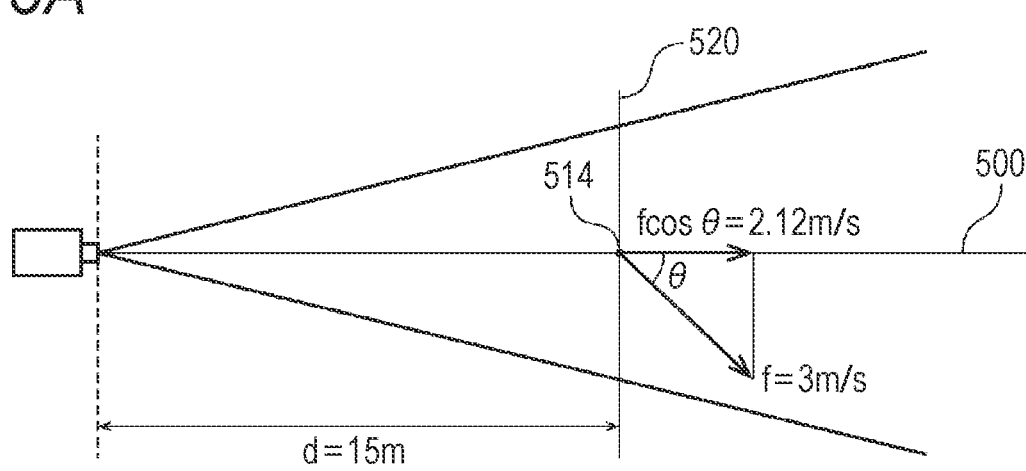
FIGS. 6A and 6B are schematic overhead diagrams for describing a relationship between a migration velocity of gas in a space and a gas flow velocity that is a correct answer of training data and an output of a learning model.
Figure 6B:
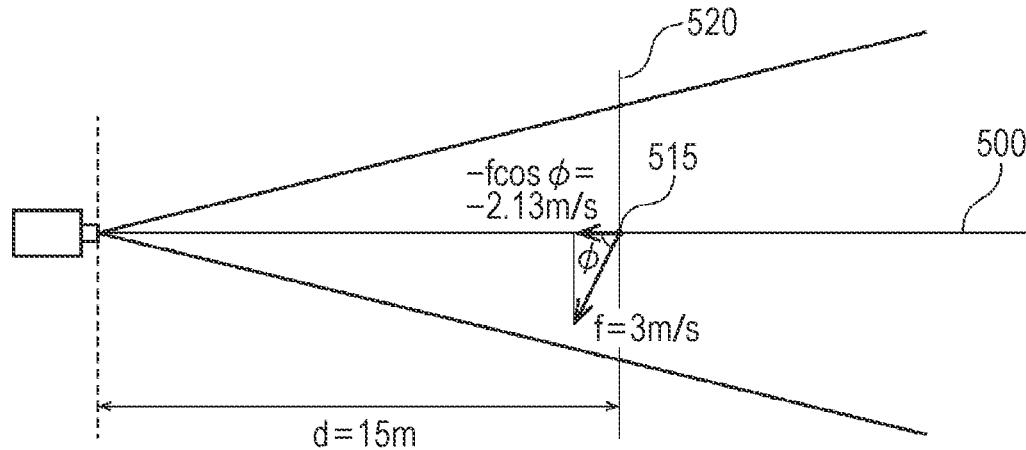

6 distribution moving image, and is an orientation in which the distance from the imaging viewpoint does not change. Note that the flow velocity component of the gas in the orientation orthogonal to the distal-proximal direction may be indicated as a relative value with respect to the image size or the number of pixels of the gas distribution moving image. In the embodiment, the number of pixels (the number of pixels) is used as a unit. For example, in a case where a gas region having a width of ten pixels in the horizontal direction in the gas distribution moving image corresponds to a gas cloud in a space having a width of 1 m in the horizontal direction, the flow velocity 3 m/s in the distal-proximal direction is designated as the flow velocity 30 pixels/s. More specifically, in a case where the gas is moving away, as illustrated in the schematic overhead diagram of FIG. 6A, first, the value of a velocity component f·cos θ along an optical axis 500 is calculated using an angle θ formed by the optical axis 500 of the image generation unit 10 and the wind direction and a wind speed f. Here, since f is 3 m/s and θ=45°, f·cos θ is 2.12 m/s. Then, by using a distance d between the image generation unit 10 and a gas cloud 514 and the relationship between the angle of view of the image generation unit 10 and the number of pixels, how many pixels in the gas distribution moving image 1 m in the vicinity of the gas cloud 514 corresponds to is calculated, and by using this, how many pixels per second the velocity component f·cos θ along the optical axis 500 corresponds to is calculated. For example, when 1 m in the vicinity of the gas cloud 514 corresponds to 88.8 pixels, the flow velocity of the gas in the distal-proximal direction is 188.3 pixels/s. Similarly, in a case where the gas is approaching, as illustrated in the schematic overhead diagram of FIG. 6B, first, the value of a velocity component –f·cos φ along the optical axis 500 is calculated using an angle φ formed by the optical axis 500 of the image generation unit 10 and the wind direction and a wind speed f. Here, the negative number is used because the flow velocity is a one-dimensional vector, the orientation of moving away is positive, and the orientation of approaching is negative. Then, similarly, by using a distance d between the image generation unit 10 and a gas cloud 515 and the relationship between the angle of view of the image generation unit 10 and the number of pixels, how many pixels in the gas distribution moving image 1 m in the vicinity of the gas cloud 515 corresponds to is calculated, and by using this, how many pixels per second the velocity component f·cos φ along the optical axis 500 corresponds to is calculated.

Since the feature amount with respect to the gas flow velocity of the gas distribution moving image is acquired in units of pixels, when the same subject is imaged using the same camera, the movement in units of pixels in the image is inversely proportional to the distance between the camera and the gas cloud. For example, when the subject at the distance of 15 m is displayed on a scale of 1.125 cm/pix, the subject at the distance of 30 m is displayed on a scale of 2.25 cm/pix. Therefore, when the motion vector in the gas distribution moving image is indicated in units of pix/s, the motion vector is inversely proportional to the subject distance. On the other hand, the ratio between the absolute value of the velocity in the direction in which the orientation of the gas cloud from the imaging viewpoint changes and the absolute value of the velocity in the distal-proximal direction does not depend on the distance between the camera and the gas cloud, the size of the angle of view of the camera itself, or the image resolution. In one aspect of the present disclosure, by converting the flow velocity of the gas in the distal-proximal direction in units of pixels, the relative relationship between the distal-proximal direction component and other components is learned and used for the movement of the gas corresponding to the gas region in the gas distribution moving image.

Figure 3:
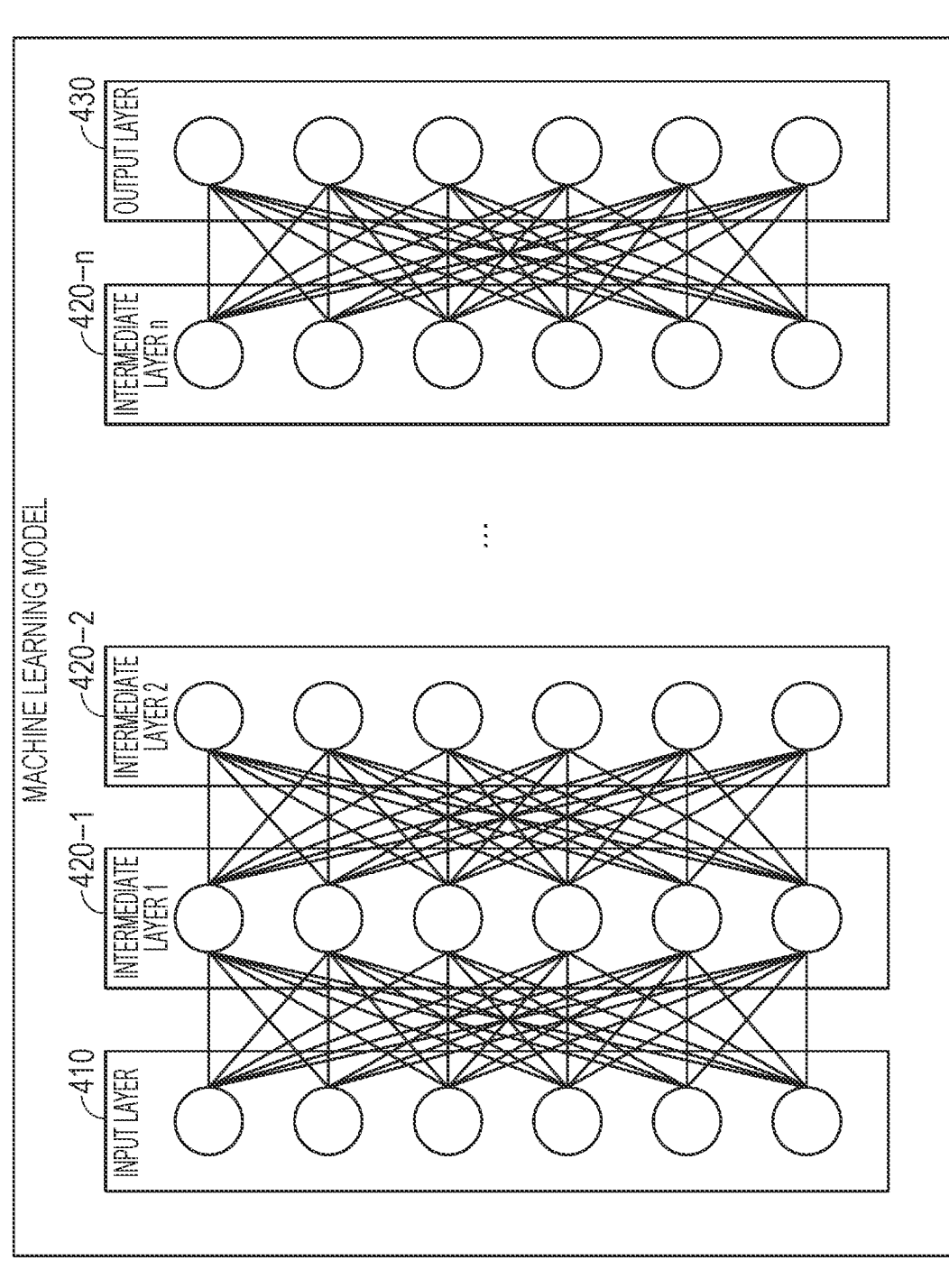
FIG. 3 is a schematic diagram illustrating an outline of a logic configuration of a machine learning model.

The machine learning unit 2141 is a learning model generation unit that executes machine learning on the basis of a combination of the gas distribution moving image received by the gas region moving image acquisition unit 212 and the flow velocity in the distal-proximal direction of the gas corresponding to the gas region of the gas distribution moving image received by the distal-proximal direction velocity acquisition unit 213, and generates a machine learning model. The machine learning model is formed so as to predict the flow velocity of the gas in the distal-proximal direction as a relative ratio with respect to the pixel size of the gas distribution moving image on the basis of a combination of the feature amounts of the gas distribution moving image, for example, a temporal change in the outer peripheral shape of the gas region, a temporal change in the gas density distribution, and the like. As the machine learning, for example, convolutional neural networks (CNN) can be used, and known software such as PyTorch can be used. FIG. 3 is a schematic diagram illustrating an outline of a logic configuration of a machine learning model. The machine learning model includes an input layer 410, an intermediate layer 420-1, an intermediate layer 420-2, . . . , an intermediate layer **420-*n*, and an output layer 430, and an interlayer filter is optimized by learning. For example, in a case where the number of pixels of the gas distribution moving image is 224×224 pixels and the number of frames is 16, the input layer 410 receives a three-dimensional tensor of 224×224× 16 to which the pixel value of the gas distribution moving image is input. The intermediate layer 420-1 is, for example, a convolution layer, and receives the three-dimensional tensor of 224×224×16 generated by a convolution operation from data of the input layer 410. The intermediate layer 420-2 is, for example, a pooling layer, and receives a three-dimensional tensor obtained by resizing the data of the intermediate layer 420-1. The intermediate layer 420-*n* is, for example, a fully connected layer, and converts the data of the intermediate layer 420-(*n*−1) into a one-dimensional vector having a velocity value as an absolute value and an orientation as a sign. Note that the configurations of the intermediate layers are examples, and the number n of the intermediate layers is about 3 to 5, but is not limited thereto. Furthermore, in FIG. 3, the number of neurons in each layer is drawn to be the same, but each layer may have any number of neurons. The machine learning unit 2141 receives the moving image, which is the gas distribution moving image, as an input, performs learning using the flow velocity of the gas in the distal-proximal direction as a correct answer, generates a machine learning model, and outputs the machine learning model to the learning model holding unit 2142. Note that, in a case where the gas sensing device 20 includes a GPU, which is an arithmetic device, and RAM, the machine learning unit 2141** may be implemented by the GPU and software.

The learning model holding unit 2142 is a learning model operation unit that holds the machine learning model generated by the machine learning unit 2141 and outputs the flow velocity of the gas in the distal-proximal direction of the gas corresponding to the gas region of the gas distribution moving image generated by the gas region moving image extraction unit 211 using the machine learning model. The flow velocity of the gas in the distal-proximal direction is specified and output as a relative value with respect to the pixel size of the input gas distribution moving image.

The determination result output unit 215 is an image display unit that converts the flow velocity of the gas in the distal-proximal direction output by the learning model holding unit 2142 into a velocity in the space, and generates an image to be superimposed on the moving image acquired by the image acquisition unit 201 and displayed on the display unit 24. The conversion from the flow velocity of the gas in the distal-proximal direction to the velocity in the space is performed by calculating a conversion coefficient indicating how many m in the gas cloud in the space one pixel in the gas region of the gas distribution moving image corresponds to by using the distance between the image generation unit 10 and the gas cloud and the relationship between the angle of view of the image generation unit 10 and the number of pixels, and integrating the conversion coefficient with the flow velocity of the gas in the distal-proximal direction output by the learning model holding unit 2142.

<Other Configurations>

The display unit 24 is, for example, a display device such as a liquid crystal display or an organic EL display.

<Operation>

Hereinafter, the operation of the gas sensing device 20 according to the present embodiment will be described below with reference to the drawings.

<Learning Phase>

Figure 7:
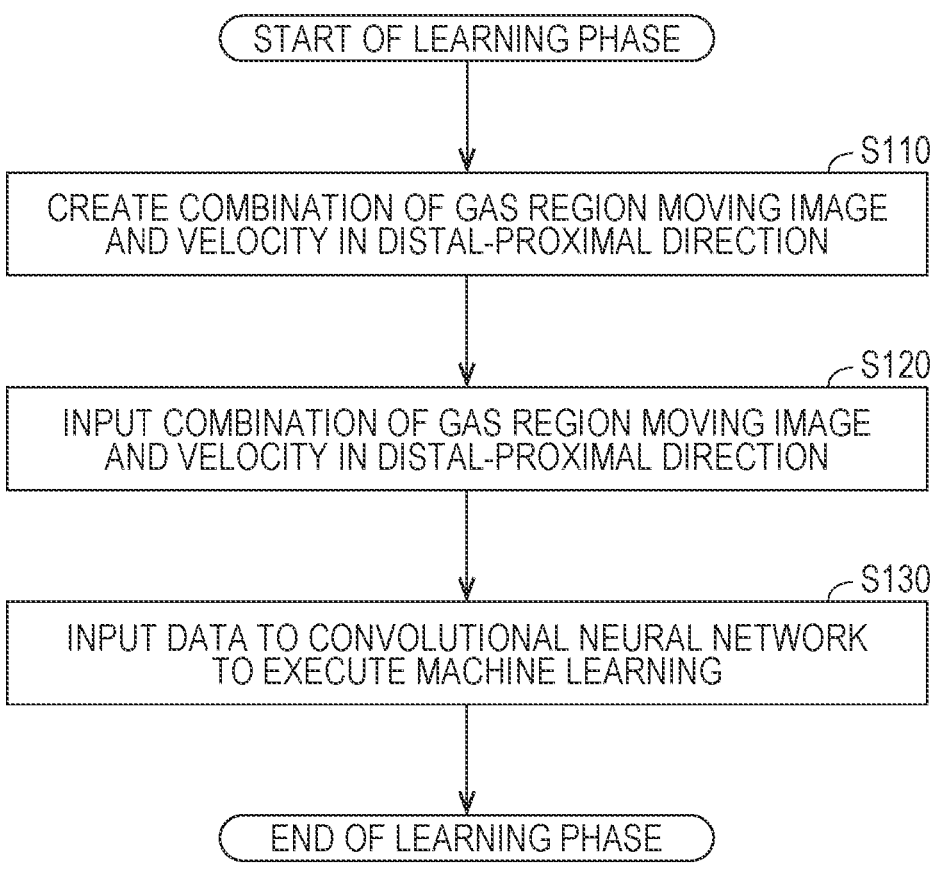
FIG. 7 is a flowchart illustrating an operation of a gas sensing device 20 in a learning phase.

FIG. 7 is a flowchart illustrating an operation of the gas sensing device 20 in a learning phase.

Figure 8A:
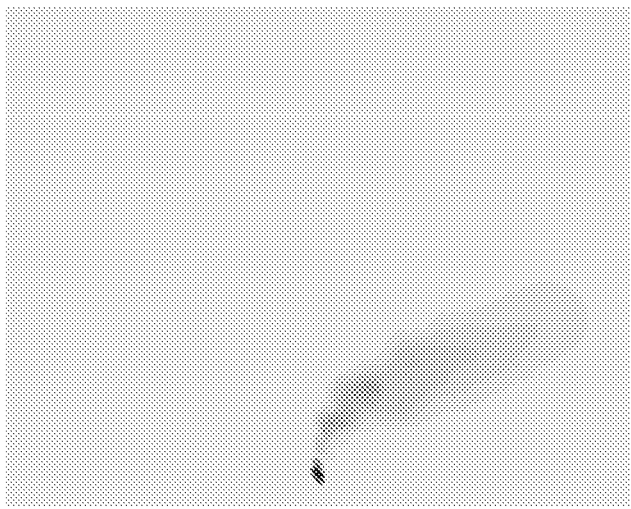
FIGS. 8A and 8B are examples of gas distribution moving images, which are training data.
Figure 8B:
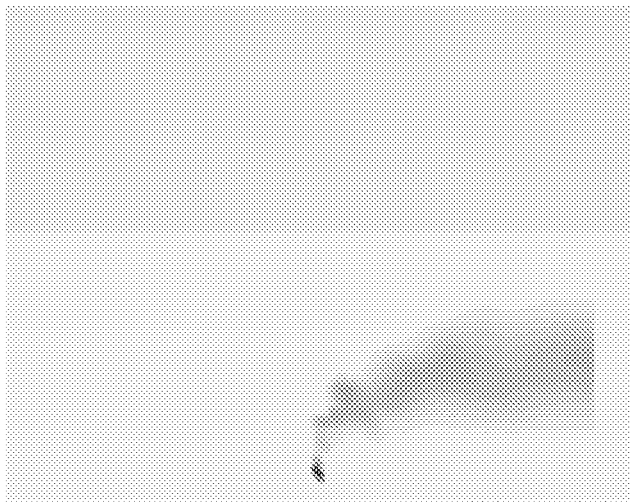

First, a combination of the gas distribution moving image and the flow velocity of the gas in the distal-proximal direction is created (step S110). As the gas distribution moving image, an image in which the flow velocity of the gas in the distal-proximal direction is known can be used. Furthermore, as described above, the flow velocity of the gas is a relative value using the scale in the gas region in the gas distribution moving image. FIG. 8A illustrates a combination of one frame in the gas distribution moving image and the flow velocity of the gas in the distal-proximal direction, which is correct answer data, and illustrates a case where the gas approaches. Furthermore, FIG. 8B illustrates a combination of one frame in the gas distribution moving image and the flow velocity of the gas in the distal-proximal direction, which is correct answer data, and illustrates a case where the gas moves away.

Figure 9A:
FIGS. 9A and 9B are examples gas distribution moving images, which are training data.
Figure 9B:
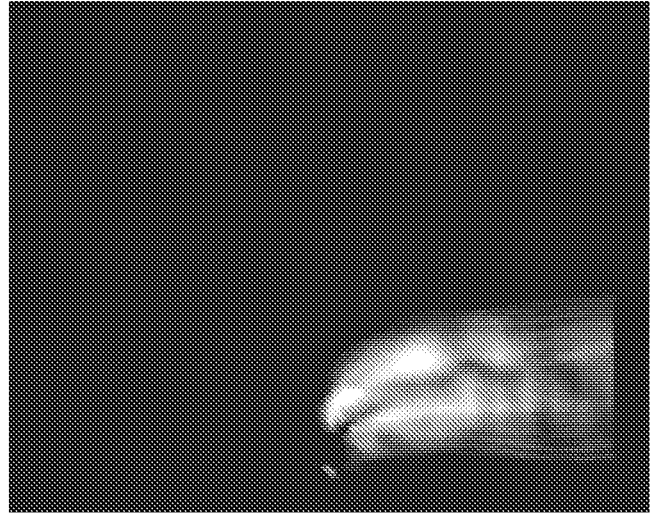

Furthermore, in a case where the gas region moving image extraction unit 211 outputs a moving image from which only a specific frequency component has been extracted as a gas distribution moving image, it is necessary to similarly set a moving image from which only a specific frequency component has been extracted as a gas distribution moving image for the gas distribution moving image in training data. FIG. 9A illustrates, as the gas distribution moving image, a combination of one frame in the gas distribution moving image in a case where only the specific frequency component is extracted and the flow velocity of the gas in the distal-proximal direction, which is correct answer data, and illustrates a case where the gas approaches. FIG. 9B illustrates, as the gas distribution moving image, a combination of one frame in the gas distribution moving image in a case where only the specific frequency component is extracted and the flow velocity of the gas in the distal-proximal direction, which is correct answer data, and illustrates a case where the gas moves away. As described above, when only a specific frequency component is extracted, high frequency noise and low frequency noise such as an overall temperature change in space can be removed, and therefore, it is possible to prevent high frequency noise and low frequency noise from being erroneously learned as feature amounts in the learning phase, and it is also possible to prevent high frequency noise and low frequency noise from affecting other feature amounts and deteriorating estimation accuracy in an operation phase to be described below.

Next, a combination of the gas distribution moving image and the flow velocity of the gas in the distal-proximal direction is input to the gas sensing device 20 (step S120). The gas distribution moving image is input to the gas region moving image acquisition unit 212, and the corresponding flow velocity of the gas in the distal-proximal direction is input to the distal-proximal direction velocity acquisition unit 213.

Next, data is input to the convolutional neural network to execute machine learning (step S130). Thus, parameters are optimized by trial and error by deep learning, and a machine-learned model is formed. The formed machine-learned model is held in the learning model holding unit 2142.

With the above operation, a machine-learned model that outputs the flow velocity of the gas in the distal-proximal direction on the basis of the feature amount with respect to the gas distribution moving image is formed.
<Operation Phase>

Figure 10:
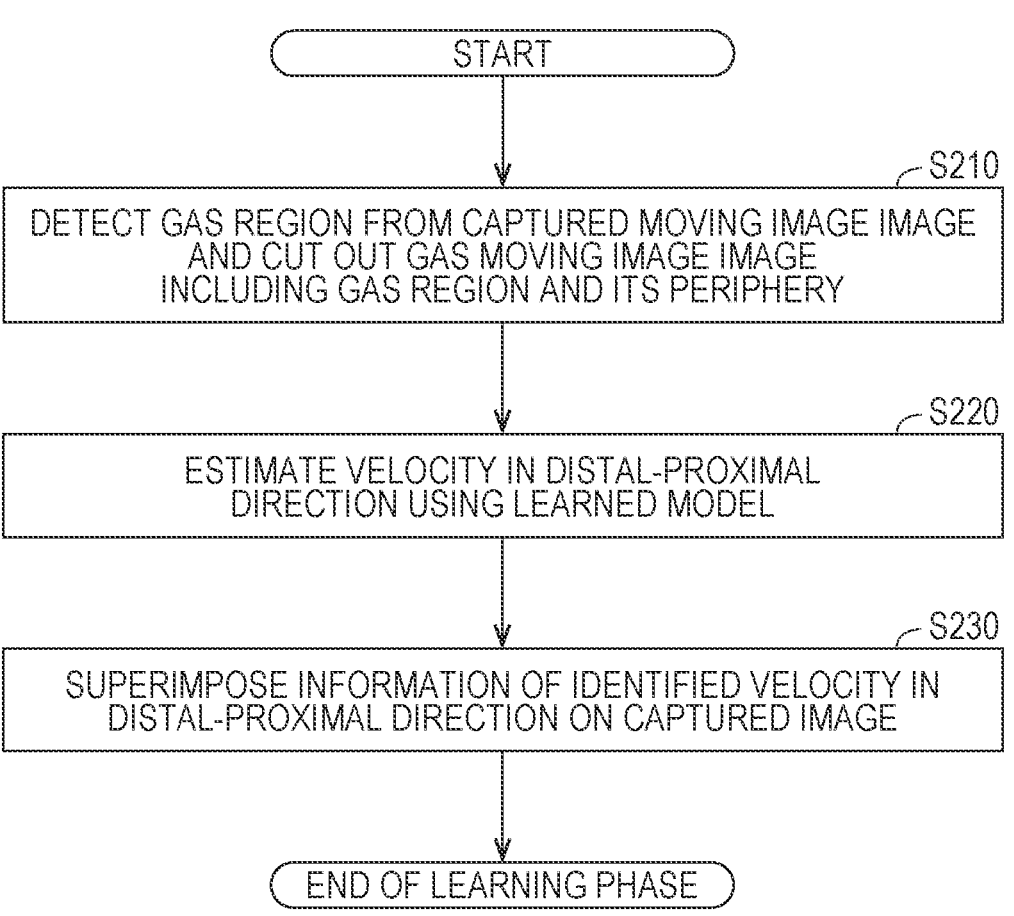
FIG. 10 is a flowchart illustrating an operation of the gas sensing device 20 in a learning phase.

FIG. 10 is a flowchart illustrating an operation of the gas sensing device 20 in a learning phase.

First, a gas region is detected from each frame of a captured image, and a gas distribution moving image including the gas region and its periphery is cut out (step S210). The detection of the gas region is performed by a known method on the basis of a time-series change in luminance in the captured image, a frequency thereof, and the like. Then, a part of each frame of the captured image is cut out so as to include all the pixels in which the gas has been detected, and a gas distribution moving image is generated using each frame. Here, in a case where a moving image from which only a specific frequency component has been extracted is used as a gas distribution moving image in training data in the learning phase, similarly, only a specific frequency component specific is extracted to obtain a gas distribution moving image.

Next, the flow velocity of the gas in the distal-proximal direction is estimated from the gas distribution moving image using the learned model (step S220). By using the machine-learned model formed in step S130, the flow velocity of the gas in the distal-proximal direction of the gas with respect to the gas region of the gas distribution moving image is estimated as a relative value with respect to the pixel in the gas region of the gas distribution moving image. Since the learning model holding unit 2142 estimates the flow velocity of the gas in the distal-proximal direction as a relative value with respect to the pixel in the gas region of the gas distribution moving image, the determination result output unit 215 converts the flow velocity of the gas in the distal-proximal direction output by the learning model holding unit 2142 into the velocity in the space. The conversion from the flow velocity of the gas in the distal-proximal direction to the velocity in the space is performed by calculating a conversion coefficient indicating how many m in the gas cloud within the space one pixel in the gas region in the gas distribution moving image corresponds to by using the distance between the image generation unit 10 and the gas cloud and the relationship between the angle of view of the image generation unit 10 and the number of pixels, and integrating the conversion coefficient with the flow velocity of the gas in the distal-proximal direction output by the learning model holding unit 2142. Then, information indicating the calculated flow velocity and orientation of the gas is superimposed on the moving image acquired by the image acquisition unit 201 and the image is output to the display unit 24.

Figure 11A:
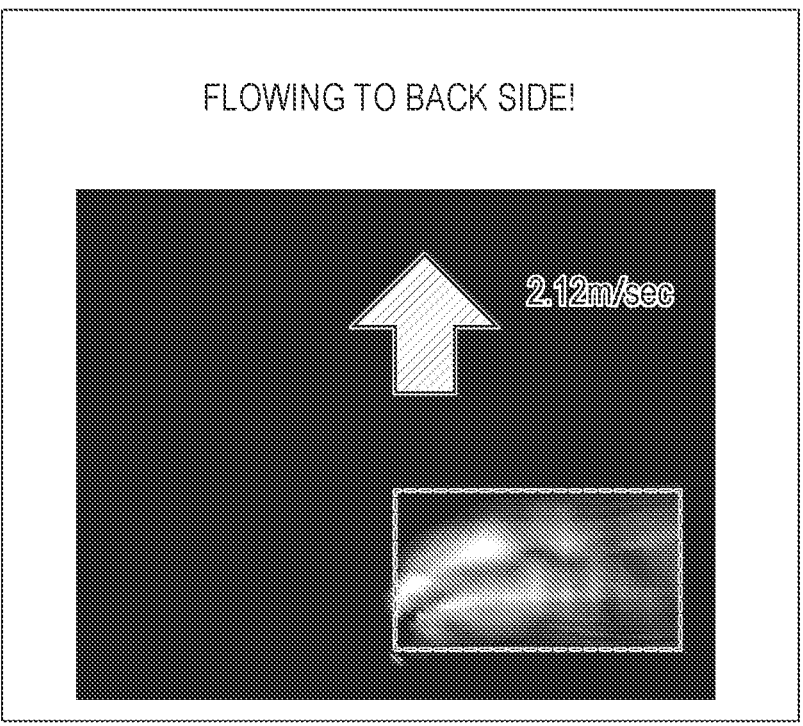
FIGS. 11A and 11B are output image examples illustrating results of velocity estimation.
Figure 11B:
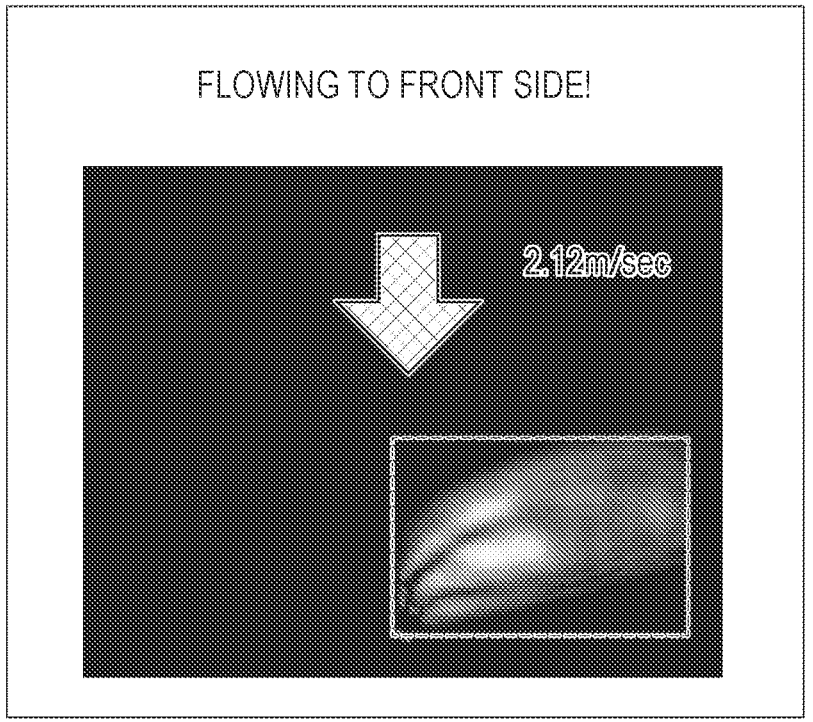
Figure 12A:
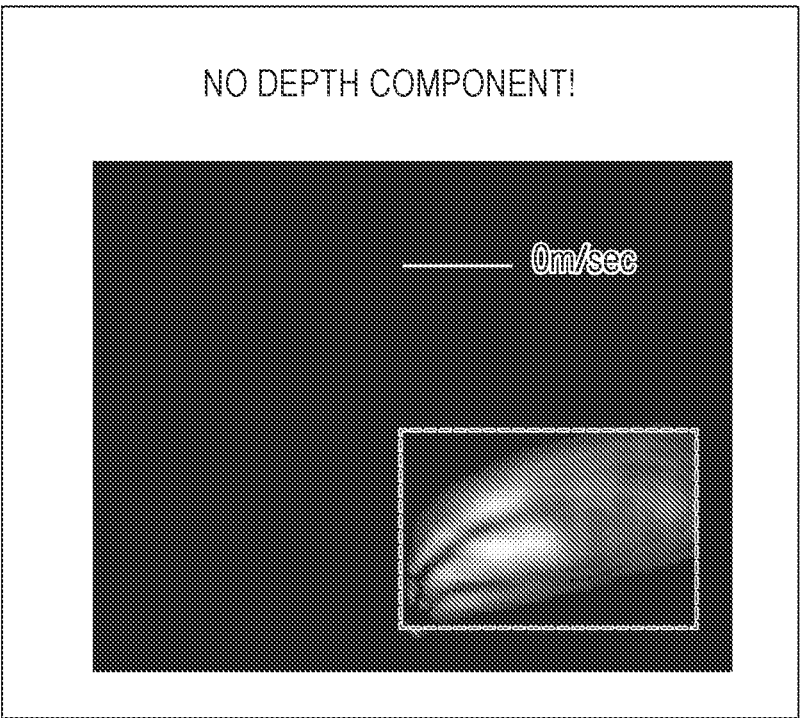
FIGS. 12A and 12B are output image examples illustrating results of velocity estimation.

As a display mode, for example, as illustrated in the output image examples of FIGS. 11A and 11B, whether the flow direction is the front side or the back side may be indicated by an arrow orientation together with the absolute value of the velocity. At this time, the color and shape of the arrow may be changed depending on whether the flow direction is the front side or the back side. Furthermore, as illustrated in FIG. 12A, in a case where the flow velocity of the gas in the distal-proximal direction is zero or extremely small, the arrows in either direction may not be displayed.

Figure 12B:
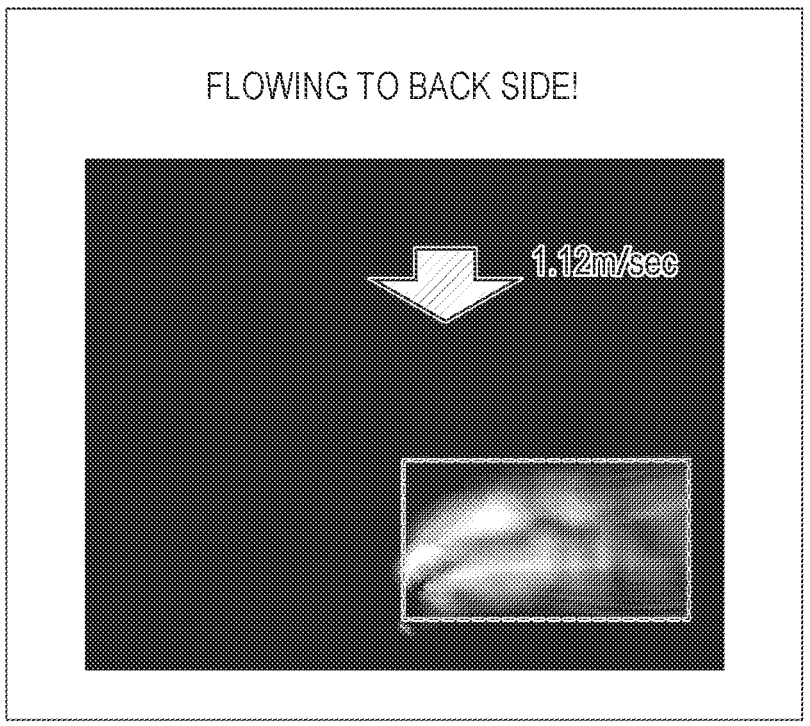
Figure 13A:
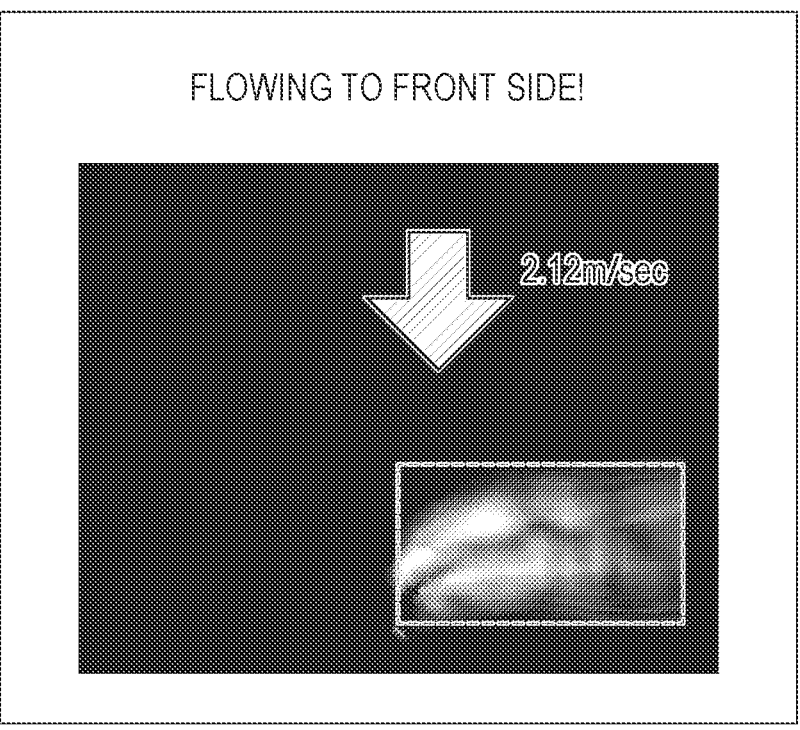
FIGS. 13A and 13B are output image examples illustrating results of velocity estimation.
Figure 13B:
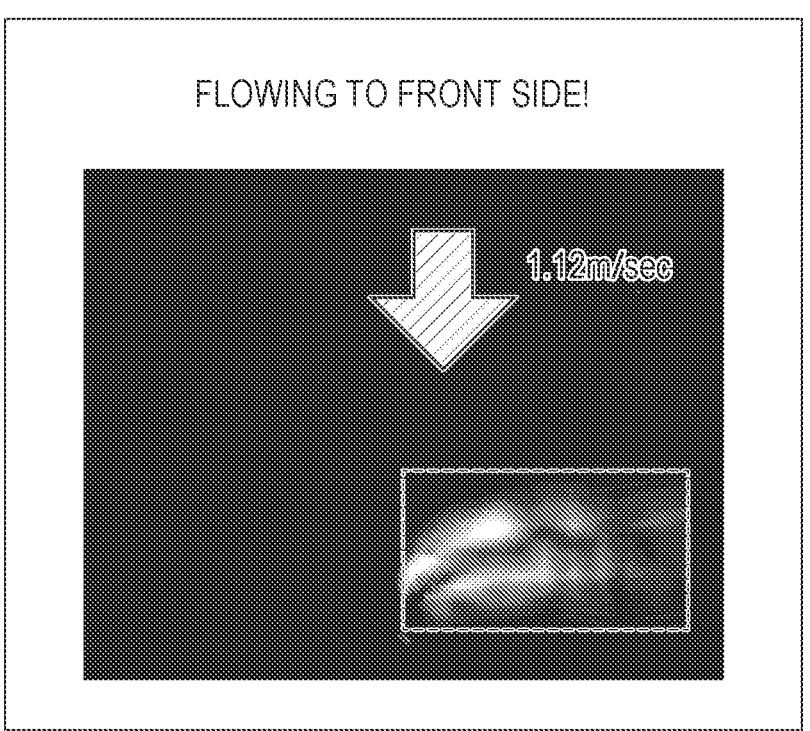
Figure 14A:
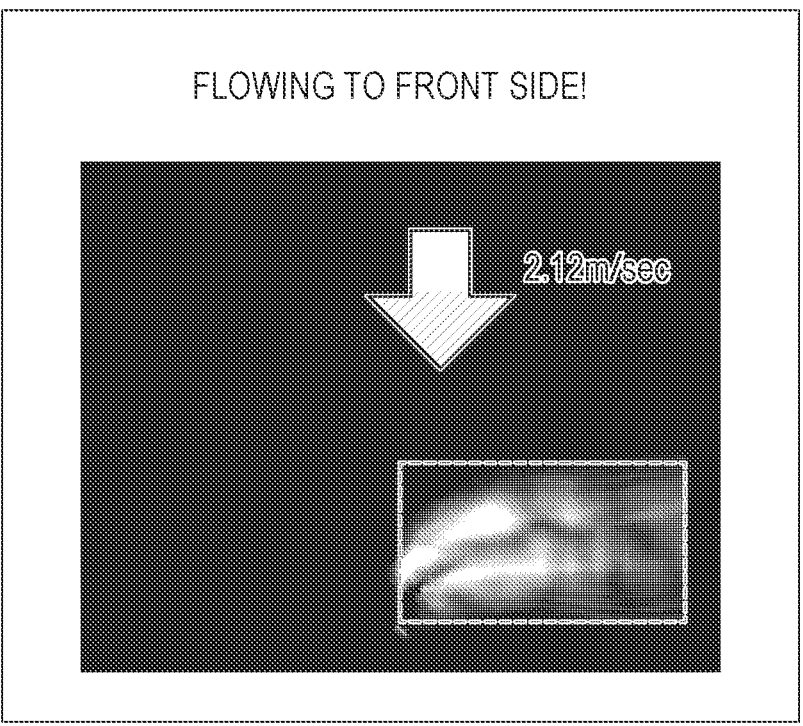
FIGS. 14A and 14B are output image examples illustrating results of velocity estimation.
Figure 14B:
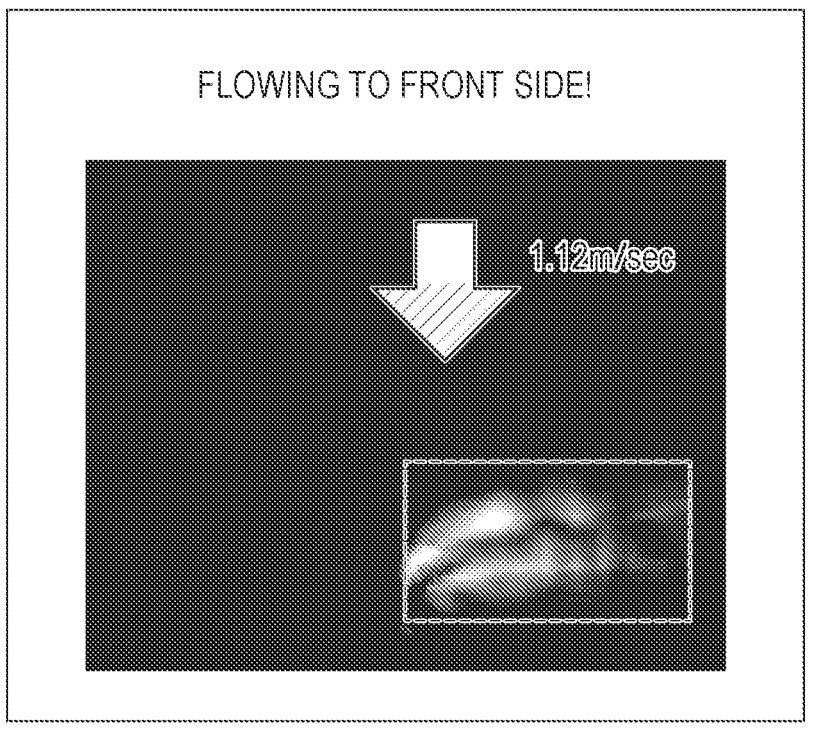

Alternatively, for example, the display mode may be changed according to the magnitude of the velocity. For example, as illustrated in FIG. 12B, the display may be performed such that the arrow becomes longer as the absolute value of the velocity is larger. Alternatively, for example, as illustrated in FIGS. 13A and 13B, the display may be performed such that the larger the absolute value of the velocity, the higher the saturation of the arrow. Alternatively, for example, as illustrated in FIGS. 14A and 14B, an arrow may be displayed with gradation of two colors, and the display may be performed such that the larger the absolute value of the velocity, the higher the saturation of one color. At this time, as illustrated in FIG. 15A, when the absolute value of the velocity is zero or extremely small, display of one color may be performed.
<Summary>

With the above configuration, in the gas sensing device that performs the gas sensing using the image, when the gas cloud is imaged as a moving image, it is possible to estimate whether the gas is approaching or moving away from the imaging device. Therefore, since the orientation in which the gas flows can be three-dimensionally estimated even in a case where the facility is imaged from one place, when a worker or the like approaches the facility, the worker or the like can approach the facility from the windward side where the gas concentration is low, and the safety can be further secured.
<<First Modification>>

In the first embodiment, the velocity in the distal-proximal direction of the gas corresponding to the gas region of the gas distribution moving image is a one-dimensional vector including an absolute value and an orientation. However, the gas velocity in the distal-proximal direction may be a probability distribution indicating a probability of being the gas velocity.

Figure 16A:
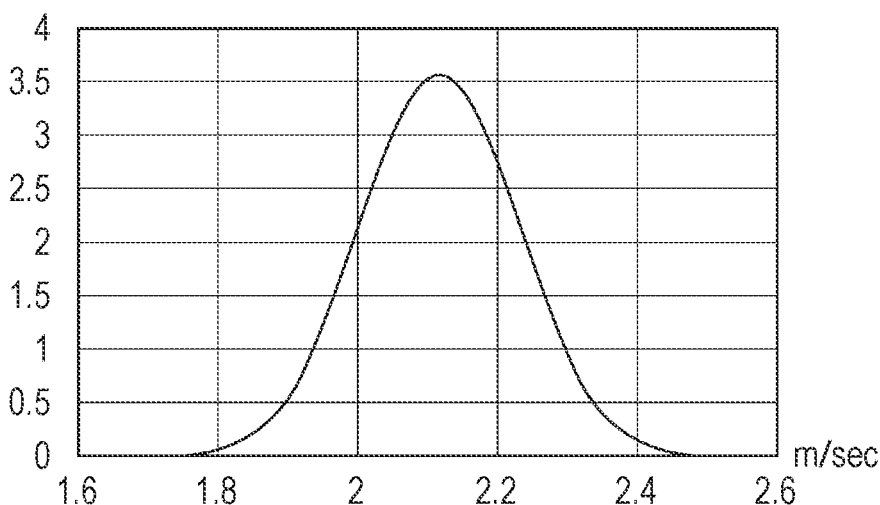
FIG. 16A illustrates a probability distribution with respect to a velocity value.
Figure 16B:
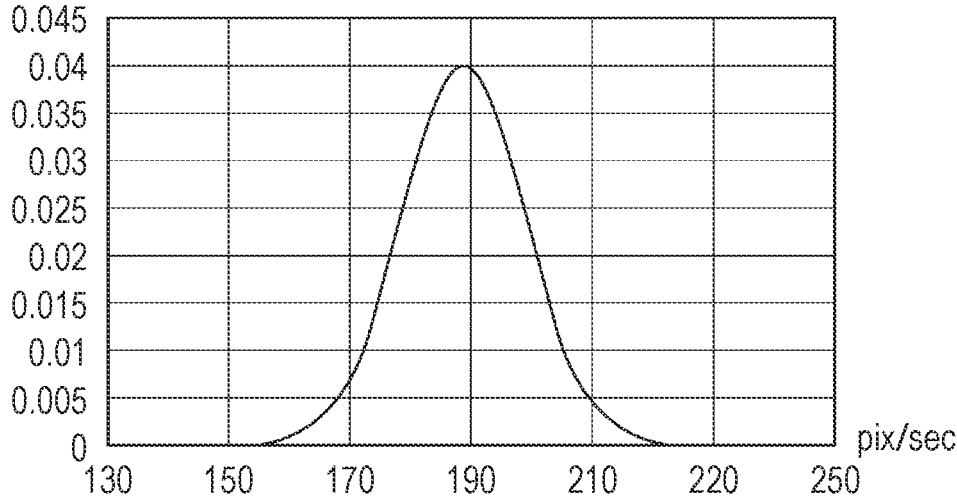
FIG. 16B illustrates a probability distribution in a case where the velocity is a relative value with respect to a pixel size.

FIG. 16A illustrates a probability distribution of the gas velocity output by the determination result output unit 215. In the graph of FIG. 16A, the horizontal axis represents the gas velocity value, and the vertical axis represents the probability that the gas velocity in the distal-proximal direction is the value indicated on the horizontal axis as a relative value. As illustrated in FIG. 16B, such data can be formed by performing coordinate transformation on the horizontal axis and the vertical axis of the probability distribution, which is the probability that the gas velocity value indicated in units of pixels as the horizontal axis and the gas velocity in the distal-proximal direction as the vertical axis are the values indicated on the horizontal axis. As a method of outputting such data, for example, there is a mode in which the determination result output unit 215 creates and outputs a normal distribution having the velocity as a median value with respect to the flow velocity of the gas in the distal-proximal direction output by the learning model holding unit 2142. Alternatively, the machine learning model may use the probability distribution of the gas velocity as the flow velocity of the gas in the distal-proximal direction. In this case, the distal-proximal direction velocity acquisition unit 213 acquires the probability distribution of the gas velocity as the flow velocity of the gas in the distal-proximal direction of the gas corresponding to the gas region of the gas distribution moving image acquired by the gas region moving image acquisition unit 212. The intermediate layer 420-$n$ of the machine learning model is designed as, for example, a fully connected layer that converts the data of the intermediate layer 420-($n$−1) into a two-row matrix that stores a combination of the value of the velocity and the probability that the value is the gas velocity as one-row data. The learning model holding unit 2142 outputs a probability distribution that is a combination of the gas velocity in the distal-proximal direction and a probability that the gas velocity in the distal-proximal direction is the gas velocity with respect to the gas distribution moving image.

<Summary>

With the above configuration, in the gas sensing device that performs the gas sensing using the image, when the gas cloud is imaged as a moving image, it is possible to estimate whether the gas is approaching or moving away from the imaging device. Therefore, since the orientation in which the gas flows can be three-dimensionally estimated even in a case where the facility is imaged from one place, when a worker or the like approaches the facility, the worker or the like can approach the facility from the windward side where the gas concentration is low, and the safety can be further secured. Furthermore, since the velocity of the gas in the distal-proximal direction is indicated as the probability distribution, it is possible to suppress a decrease in the gas velocity estimation accuracy due to shortage of training data or over-learning of biased training data, and to easily improve the estimation accuracy.

<<Second Modification>>

In the first embodiment and the first modification, one gas sensing device is used to estimate the velocity of the gas in the distal-proximal direction in the operation mode using the machine learning model generated in the learning mode. However, the machine learning and the identification of the estimation of the velocity of the gas in the distal-proximal direction do not need to be performed by the same hardware, and may be executed by using different hardware.

Figure 15:
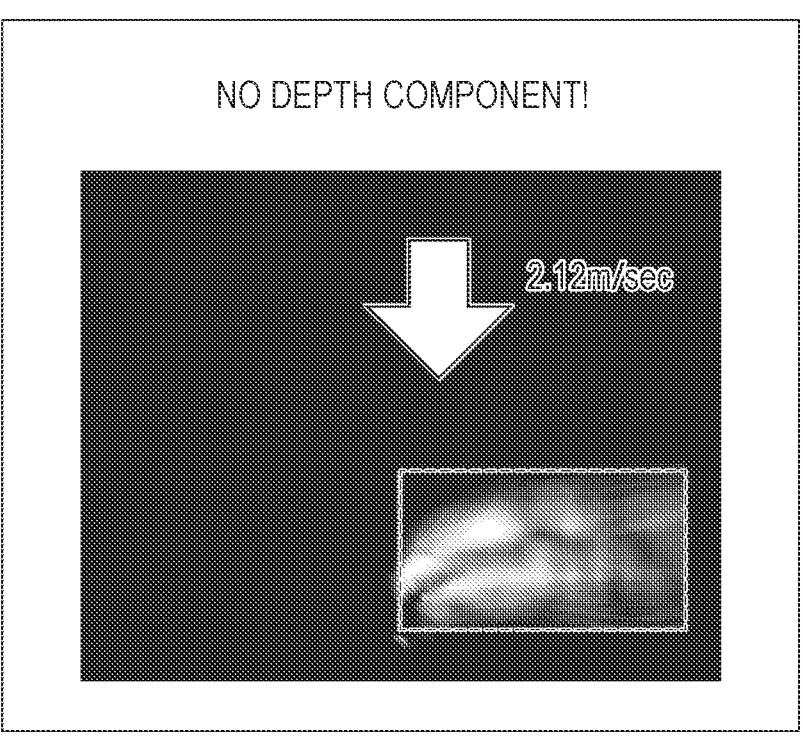
FIG. 15 is an output image example illustrating a result of velocity estimation.
Figure 17:
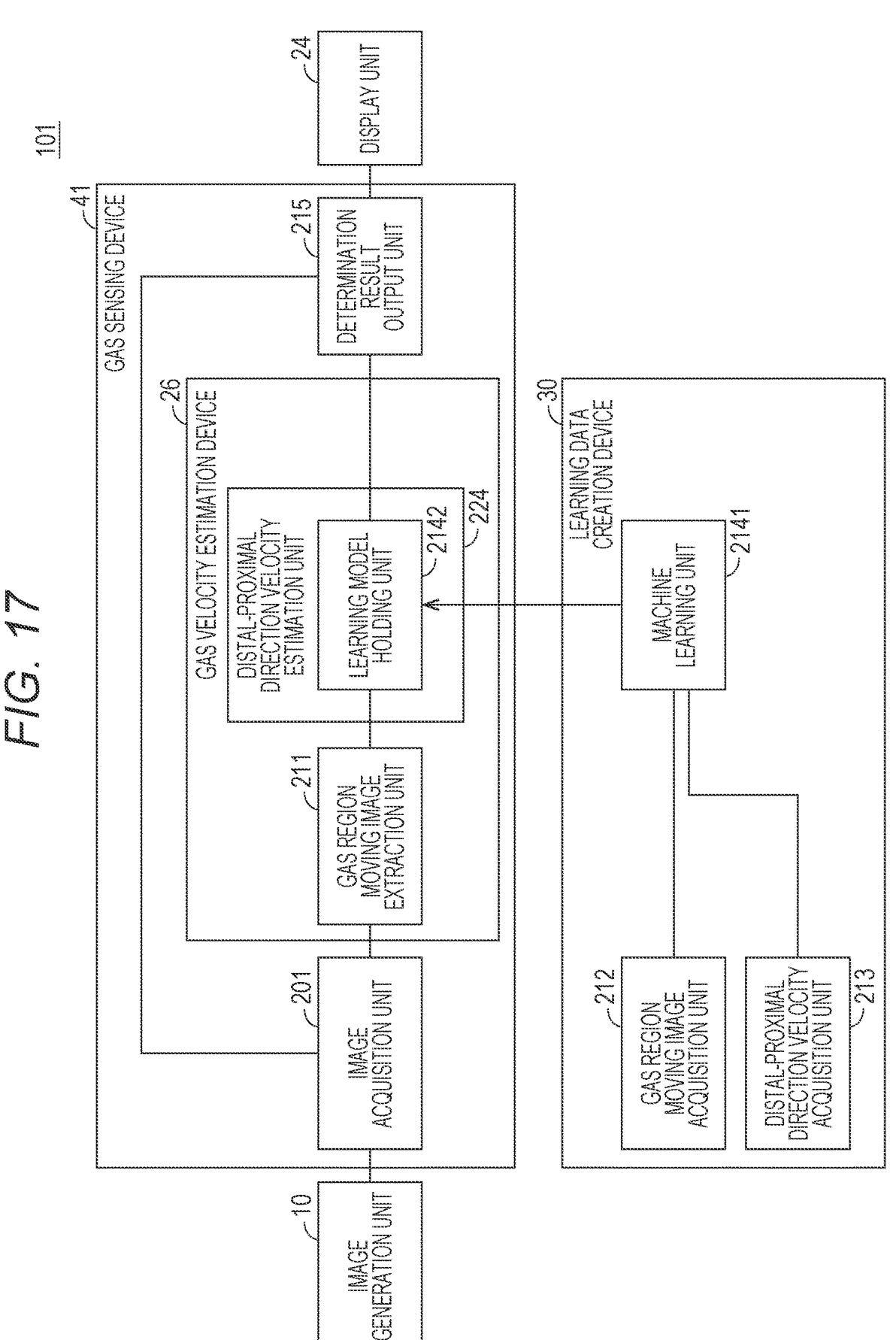
FIG. 17 is a function block diagram of a gas sensing system 101 according to a second modification.

FIG. 17 is a function block diagram of a gas sensing system 101 according to a second modification. As illustrated in FIG. 15, the gas sensing system 101 includes the image generation unit 10 for capturing an image of a monitoring target, a gas sensing device 41 that senses gas on the basis of the image acquired by the image generation unit 10, a learning data creation device 30, and the display unit 24. The image generation unit 10, the display unit 24, and the learning data creation device 30 are each configured to be connectable to the gas sensing device 41.

The gas sensing device 41 is a device that acquires the moving image obtained by capturing the image of the monitoring target from the image generation unit 10, detects a gas region on the basis of the moving image, and notifies a user of gas sensing through the display unit 24. The gas sensing device 41 is implemented as a computer including, for example, a general CPU and RAM, and a program executed by them. The gas sensing device 41 includes the image acquisition unit 201, the gas region moving image extraction unit 211, the learning model holding unit 2142, and the determination result output unit 215. The learning model holding unit 2142 constitutes a distal-proximal direction velocity estimation unit 224. Furthermore, the gas region moving image extraction unit 211 and the distal-proximal direction velocity estimation unit 224 constitute a gas velocity estimation device 26. The learning data creation device 30 is implemented as a computer including, for example, a general CPU, GPU, and RAM, and a program executed by them. The learning data creation device 30 includes the gas region moving image acquisition unit 212, the distal-proximal direction velocity acquisition unit 213, and the machine learning unit 2141.

The gas sensing device 41 performs only the operation mode operation of the gas sensing device 20 according to the first embodiment. Furthermore, the learning data creation device 30 performs only the learning mode operation of the gas sensing device 20 according to the first embodiment. The gas sensing device 41 and the learning data creation device 30 are connected by, for example, a LAN, and the learned model formed by the learning data creation device 30 is stored in the learning model holding unit 2142 of the gas sensing device 41. Note that the storage of the learned model in the learning model holding unit 2142 is not limited to duplication by a network, and may be performed using, for example, a removable medium, an optical disk, ROM, or the like.

<Summary>

With the above configuration, in the gas sensing device that performs the gas sensing using the image, when the gas cloud is imaged as a moving image, it is possible to estimate whether the gas is approaching or moving away from the imaging device. Furthermore, since the machine learning and the estimation of the velocity of the gas in the distal-proximal direction are performed by different hardware, the gas sensing device does not need to have a resource for the machine learning. Therefore, it is sufficient if the gas sensing device has a resource for operating the learned model, and can be implemented using a simple device such as a notebook computer, a smartphone, or a tablet. Furthermore, since the learned model constructed by machine learning using one learning data creation device 30 can be operated by the plurality of gas sensing devices 41, the gas sensing device 41 can be easily manufactured.

Second Embodiment

In the first embodiment and each modification, the case of estimating only the migration velocity of the gas in the distal-proximal direction has been described. However, the migration velocity of the gas in the direction in which the orientation from the imaging viewpoint changes may be further estimated, and the migration direction and the velocity of the gas may be three-dimensionally estimated.

The gas sensing system 200 according to the second embodiment is characterized by further estimating the migration velocity of the gas in the direction in which the orientation from the imaging viewpoint changes and three-dimensionally estimating the migration direction and the velocity of the gas.

Figure 18:
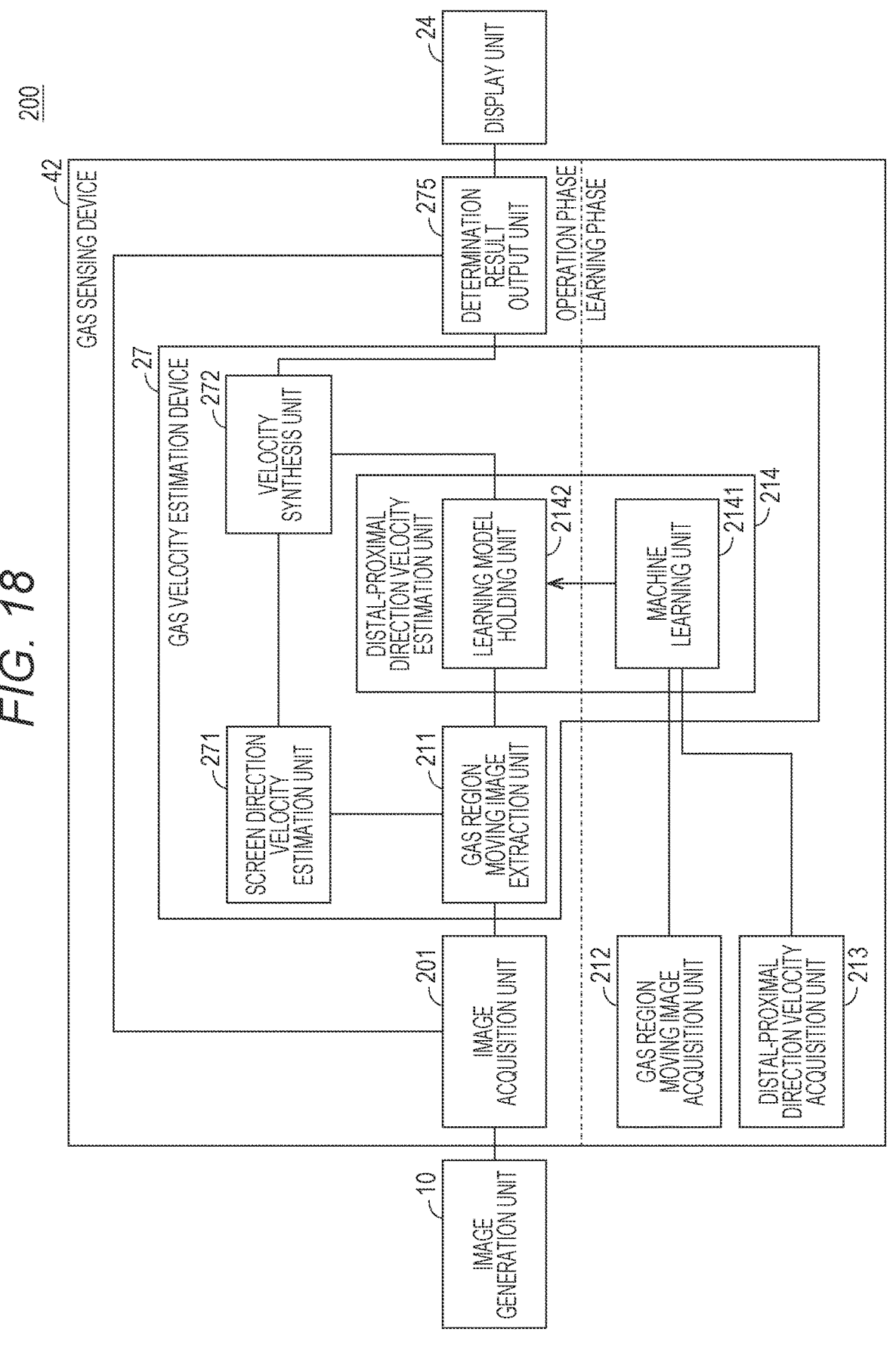
FIG. 18 is a function block diagram illustrating a configuration of a gas sensing system 200 according to a second embodiment.

FIG. 18 is a function block diagram illustrating a configuration of the gas sensing system 200 according to the second embodiment. As illustrated in FIG. 18, a gas sensing device 42 of the gas sensing system 200 includes a gas velocity estimation device 27 further including a screen direction velocity estimation unit 271 and a velocity synthesis unit 272, and a determination result output unit 275 instead of the gas velocity estimation device 21 and the determination result output unit 215.

The screen direction velocity estimation unit 271 calculates a motion vector of the gas region in the screen from the gas distribution moving image generated by the gas region moving image extraction unit 211, and identifies the motion vector as the migration velocity and the direction of the gas in the direction in which the orientation of the gas from the imaging viewpoint changes (direction orthogonal to the distal-proximal direction). Specifically, for example, pattern matching is performed between two frames constituting the gas distribution moving image, an arithmetic average of the detected migration vectors is obtained, and the average is output as a two-dimensional vector. For example, when the migration velocity in the x direction (horizontal direction) is 180 pixels/s and the migration velocity in the y direction (up-down direction) is 0 pixels/s, (180,0) is output as the migration velocity.

The velocity synthesis unit 272 estimates a three-dimensional gas migration direction and its velocity from the gas migration velocity and direction in the direction in which the orientation from the imaging viewpoint changes estimated by the screen direction velocity estimation unit 271 and the gas migration velocity and direction in the distal-proximal direction estimated by the learning model holding unit 2142. Assuming that the migration vector of the gas in the direction in which the orientation from the imaging viewpoint changes estimated by the screen direction velocity estimation unit 271 is $(v_x, v_y)$ [pixel/s], and the migration vector of the gas in the distal-proximal direction estimated by the learning model holding unit 2142 is $v_z$ [pixel/s], an absolute value v of the three-dimensional gas migration velocity is expressed by the equation described below.

$$v^2 = v_x^2 + v_y^2 + v_z^2$$

The velocity synthesis unit 272 outputs the calculated absolute value v of the three-dimensional gas migration velocity and the migration velocity $v_z$ of the gas in the distal-proximal direction to the determination result output unit 275.

The determination result output unit 275 converts the three-dimensional gas flow velocity output by the velocity synthesis unit 272 into a velocity in the space, and generates an image to be superimposed on the moving image acquired by the image acquisition unit 201 and displayed on the display unit 24. The conversion from the three-dimensional flow velocity v of the gas to the velocity in the space is performed by calculating a conversion coefficient indicating how many m in the gas cloud in the space one pixel in the gas region of the gas distribution moving image corresponds to by using the distance between the image generation unit 10 and the gas cloud and the relationship between the angle of view of the image generation unit 10 and the number of pixels, and integrating the conversion coefficient with the three-dimensional flow velocity v of the gas output by the learning model holding unit 2142.

Figure 19A:
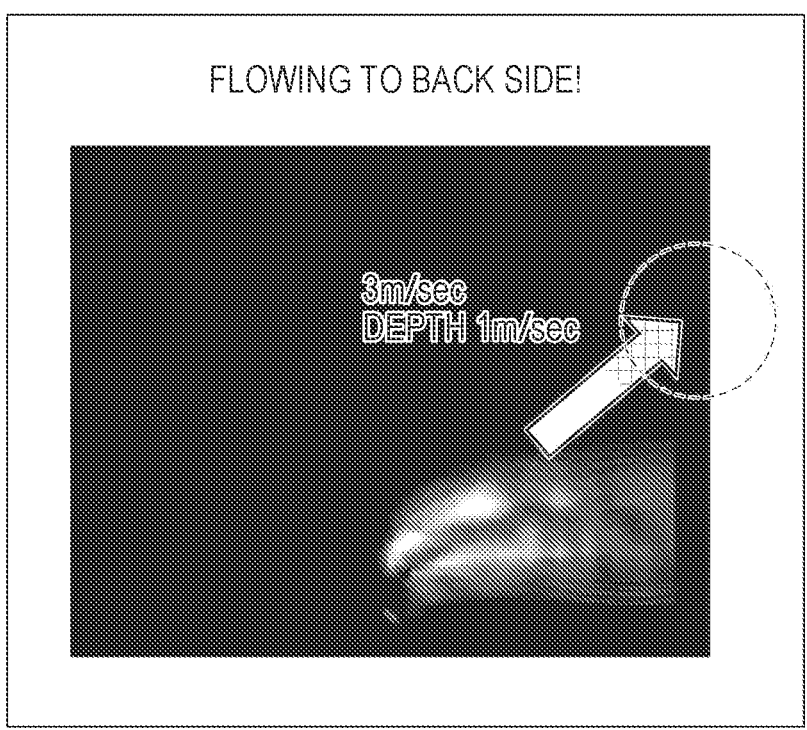
FIGS. 19A and 19B are output image examples illustrating results of velocity estimation.
Figure 19B:
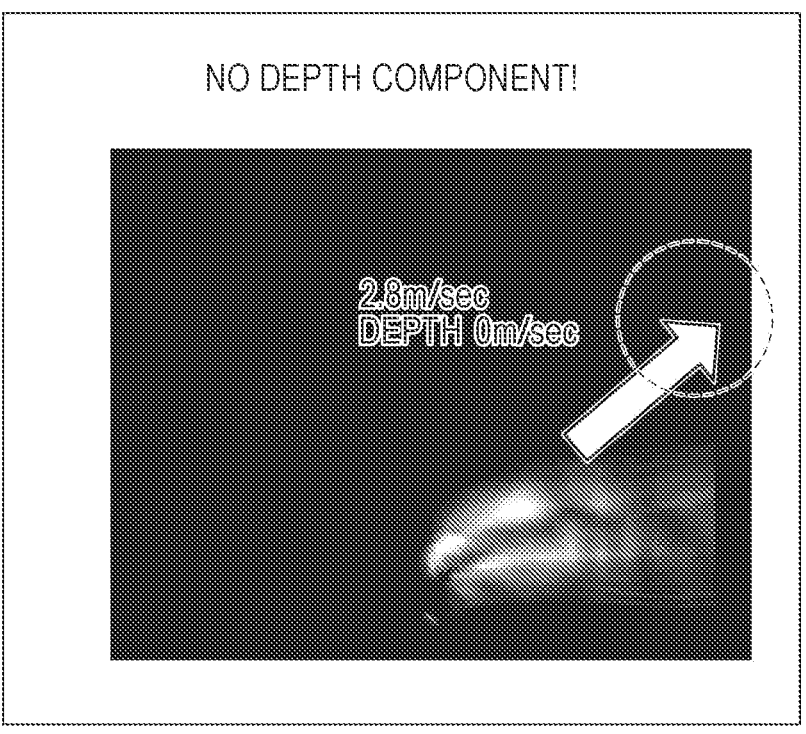

As a display mode, for example, the flow direction is indicated by the orientation of an arrow together with the absolute value v of the velocity and the absolute value of the migration velocity $v_z$ of the gas in the distal-proximal direction. At this time, the color and shape of the arrow may be changed depending on whether the flow direction in the distal-proximal direction is the front side or the back side. Furthermore, for example, the display mode may be changed according to the magnitude of the velocity. For example, the display may be performed such that the arrow becomes longer as the absolute value of the velocity is larger. Alternatively, for example, the display may be performed such that the larger the absolute value of the velocity, the higher the saturation of the arrow. Alternatively, for example, an arrow may be displayed with gradation of two colors, and the display may be performed such that the larger the absolute value of the velocity, the higher the saturation of one color. An output image example in FIG. 19A is such that an arrow is displayed with gradation of two colors and the display is performed such that the larger the absolute value of the velocity $v_z$ in the distal-proximal direction, the higher the saturation of one color. At this time, as indicated in an output image example in FIG. 19B, when the absolute value of the velocity $v_z$ in the distal-proximal direction is zero or extremely small, display of one color may be performed.

<Summary>

With the above configuration, in the gas sensing system that performs the gas sensing using the image, when the gas region is imaged, the flow velocity of the gas can be three-dimensionally estimated.

<<Other Modifications According to Embodiments>>

(1) In the second embodiment, the flow velocity of the gas is output as a value, but as in the first modification, it may be output as a probability distribution of the velocity. At this time, the three-dimensional velocity can be calculated as the probability distribution by calculating the velocity in the distal-proximal direction as the probability distribution and then synthesizing the calculated probability distribution with the velocity in the direction in which the orientation from the imaging viewpoint of the gas changes.

(2) In the second embodiment and the first modification, both the machine learning and the estimation of the velocity in the distal-proximal direction are performed by one gas sensing device, but, similarly to the second modification, the machine learning may be performed by a learning model generation device and the gas velocity estimation device may perform only the estimation of the velocity in the distal-proximal direction.

(3) In each embodiment and each modification, the absolute value of the velocity of the gas in the distal-proximal direction is displayed on the display unit, but it is not limited thereto, and only the presence or absence of migration of the gas in the distal-proximal direction may be simply displayed. Furthermore, for example, in the second embodiment, the orientation of gas flow when the camera or the leakage source is viewed from above may be displayed. Such display can be performed by calculating the flow orientation of the gas from the velocity $v_x$ of the gas in the horizontal direction when the orientation of the gas from the imaging viewpoint changes and the velocity $v_z$ of the gas in the distal-proximal direction.

(4) In each embodiment and modification, the captured image is an infrared image having a wavelength of 3.2 to 3.4 μm, but it is not limited thereto, and any image such as an infrared image, a visible image, or an ultraviolet image in another wavelength range may be used as long as the presence of the gas to be sensed can be confirmed. Furthermore, the method of sensing the gas region is not limited to the above-described method, and may be any processing capable of sensing the gas region.

Moreover, a gas to be sensed and a gas corresponding to the image shown in the captured image may not be the same, and, for example, in a case where there is knowledge that two or more types of gases are present at the same place, processing may be performed by regarding and using an image of one type of gas as an image of the other gas. For example, in a case where water vapor and a gas to be sensed are present at substantially the same place in the space, an image of the water vapor may be handled as an image of the gas to be sensed by using an image in which the image of the water vapor is regarded as a gas region.

(5) In each embodiment and modification, the gas distribution moving image in which the flow velocity of the gas in the distal-proximal direction is known is used as the training data. However, the training data is not limited thereto, and, for example, a gas distribution moving image may be created by simulation. More specifically, for example, modeling is performed in which a structure is laid out in a three-dimensional space on the basis of three-dimensional voxel data of a facility. Next, conditions such as the type of gas, the flow rate, the wind speed, the wind direction, the shape, the diameter, and the position of the gas leakage source are determined, a three-dimensional fluid simulation is performed, and the gas distribution state is calculated. A viewpoint is set in a space for the three-dimensional model formed in this manner, and a two-dimensional image from the viewpoint is generated as a gas distribution image. Specifically, the light intensity of each pixel is calculated by calculating the gas concentration length for the gas present between the viewpoint and the surface of the facility with respect to one straight line corresponding to one pixel of the gas distribution image and passing through the viewpoint in the space, and the pixel value is calculated. Then, training data can be created by performing pairing by using a distal-proximal direction component from the viewpoint of the wind speed at the time of simulation as a correct answer.

(6) Note that although the present invention has been described on the basis of the above embodiments, the present invention is not limited to the above embodiments, and the cases described below are also included in the present invention.

For example, in the present invention, the gas velocity estimation device may be a device in which field programmable gate array (FPGA) or an application specific integrated circuit (ASIC) is used as a processor.

Furthermore, some or all of the constituent elements constituting each of the above-described devices may include one system large scale integration (LSI). The system LSI is a super multifunctional LSI manufactured by integrating a plurality of constituent units on one chip, and is specifically a computer system including a microprocessor, ROM, RAM, and the like. These may be individually integrated into one chip, or may be integrated into one chip so as to include some or all of them. Note that an LSI may be called an IC, a system LSI, a super LSI, or an ultra LSI depending on difference in degree of integration. The RAM stores a computer program for achieving the same operation as each of the above devices. The microprocessor operates in accordance with the computer program, whereby the system LSI achieves its functions. For example, a case where a gas velocity estimation method of the present invention is stored as an LSI program, the LSI is inserted into a computer, and a predetermined program is executed is also included in the present invention.

Note that the manner of an integrated circuit is not limited to an LSI, but may be achieved by a dedicated circuit or a general-purpose processor. After the LSI is manufactured, an FPGA, which is programmable, or a reconfigurable processor that is reconfigurable for connection or setting of a circuit cell in an LSI may be used.

Moreover, when an integrated circuit technology that replaces the LSI turns into reality because of progress of semiconductor technology or by a derived, different technology, of course, integration of a functional block may be performed using such technology.

Furthermore, the division of the functional blocks in the block diagram is an example, and a plurality of functional blocks may be realized as one functional block, one functional block may be divided into a plurality of functional blocks, or some functions may be transferred to another functional block. Furthermore, functions of a plurality of functional blocks having similar functions may be processed in parallel or in a time division manner by single hardware or software.

Furthermore, the order in which the above steps are executed is for specifically describing the present invention, and may be an order other than the above order. Furthermore, some of the above steps may be executed simultaneously (in parallel) with other steps.

Furthermore, at least some of the functions of the gas velocity estimation device according to each embodiment and the modifications thereof may be combined. Further, the numbers used above are all illustrated to specifically describe the present invention, and the present invention is not limited to the illustrated numbers.

Moreover, the present invention also includes various modifications in which the present embodiment is modified within the scope conceived by those skilled in the art.

<<Summary>>

(1) A gas migration estimation device according to one aspect of the present disclosure includes: an image input unit that receives, as an input, a gas distribution moving image including a plurality of frames and in which a presence range of gas leaked into a space is indicated as a gas region; and a gas migration estimation unit that estimates a migration state of gas in a distal-proximal direction corresponding to the gas distribution moving image received by the image acquisition unit, by using an estimation model that is machine-learned using a combination of a training gas distribution moving image and a migration state of gas in a distal-proximal direction in the training gas distribution moving image as training data.

Furthermore, a gas migration estimation method according to one aspect of the present disclosure includes: receiving, as an input, a gas distribution moving image including a plurality of frames and in which a presence range of gas leaked into a space is indicated as a gas region; and estimating a migration state of gas in a distal-proximal direction corresponding to the gas distribution moving image received by using an estimation model that is machine-learned using a combination of a training gas distribution moving image and a migration state of gas in a distal-proximal direction in the training gas distribution moving image as training data.

Furthermore, a program according to one aspect of the present disclosure is a program causing a computer to perform gas migration estimation processing, the gas migration estimation processing including: receiving, as an input, a gas distribution moving image including a plurality of frames and in which a presence range of gas leaked into a space is indicated as a gas region; and estimating a migration state of gas in a distal-proximal direction corresponding to the gas distribution moving image received by using an estimation model that is machine-learned using a combination of a training gas distribution moving image and a migration state of gas in a distal-proximal direction in the training gas distribution moving image as training data.

With the gas migration estimation device, the gas migration estimation method, and the program according to one aspect of the present disclosure, the migration state of the gas in the distal-proximal direction is estimated on the basis of the feature of the gas region in the gas distribution moving image. Therefore, by appropriately designing training data, it is possible to identify whether the gas is approaching or moving away with respect to an imaging position.

(2) In the gas migration estimation device according to one aspect of the present disclosure, the gas migration estimation unit may use a relative distal-proximal velocity indicating a migration velocity of the gas in the distal-proximal direction as a relative value with respect to the migration velocity in a viewing angle direction, as the migration state of the gas in the distal-proximal direction in the training data.

With the above configuration, even when the imaging conditions such as the distance to the gas and the visual field range of the imaging device are different between the gas distribution moving image, which is the target for estimating the migration state, and the training gas distribution moving image, the migration state of the gas in the distal-proximal direction can be estimated.

(3) In the gas migration estimation device according to one aspect of the present disclosure, the gas migration estimation unit may output a migration velocity of the gas in the distal-proximal direction in the gas distribution moving image received by the image input unit as the migration state of the gas in the distal-proximal direction.

With the above configuration, since the velocity of the gas can be obtained with respect to the orientation from the imaging viewpoint toward the gas, it is possible to consider in more detail whether or not a person can approach while avoiding the gas.

(4) In the gas migration estimation device according to one aspect of the present disclosure, the gas migration estimation unit may output a probability distribution of a migration velocity of the gas in the distal-proximal direction in the gas distribution moving image received by the image input unit as the migration state of the gas in the distal-proximal direction.

With the above configuration, it is possible to obtain a range in which the velocity of the gas can be taken with respect to the orientation from the imaging viewpoint toward the gas, and thus, it is possible to consider whether or not a person can approach while enhancing safety.

(5) In the gas migration estimation device according to one aspect of the present disclosure, the image input unit may include an imaging means that senses infrared light, and the gas region may be an image of gas that absorbs the infrared light, or water vapor.

With the above configuration, one aspect of the present disclosure can be applied to a gas that can be detected using infrared light or a gas whose presence can be estimated using the presence range of the gas.

(6) In the gas migration estimation device according to one aspect of the present disclosure, the image input unit may include an imaging means that senses visible light, and the gas region may be an image of gas that absorbs the visible light, or water vapor.

With the above configuration, one aspect of the present disclosure can be applied to a gas that can be detected using visible light or a gas whose presence can be estimated using the presence range of the gas.

(7) In the gas migration estimation device according to one aspect of the present disclosure, the image input unit may receive, as an input, a gas distribution moving image obtained by extracting a specific frequency component from a moving image obtained by imaging a space.

With the above configuration, machine learning and gas migration estimation can be performed by removing high frequency noise and low frequency noise, so that the probability that estimation can be correctly performed can be improved.

(8) The gas migration estimation device according to one aspect of the present disclosure may further include: an image display unit that superimposes and displays the migration state of the gas in the distal-proximal direction on the gas distribution moving image received by the image input unit.

With the above configuration, a facility manager or the like can easily grasp the migration state of the gas, and the usability is improved.

(9) In the gas migration estimation device according to one aspect of the present disclosure, the image display unit may display at least one of presence or absence of migration of the gas in the distal-proximal direction, a migration direction, and a migration velocity by color.

With the above configuration, a facility manager or the like can easily grasp the migration state of the gas on the basis of the color, and the usability is improved.

(10) In the gas migration estimation device according to one aspect of the present disclosure, the image display unit may display at least one of presence or absence of migration of the gas in the distal-proximal direction, a migration direction, and a migration velocity by a length of a line or an arrow.

With the above configuration, a facility manager or the like can easily grasp the presence or absence of migration of the gas, a migration direction, a migration velocity, and the like, and the usability is improved.

(11) The gas migration estimation device according to one aspect of the present disclosure further includes: a three-dimensional flow estimation unit that estimates a migration state of gas in a viewing angle direction in the gas distribution moving image received by the image input unit, and estimates a migration state of gas as three-dimensional information from the migration state of the gas in the viewing angle direction and the migration state of the gas in the distal-proximal direction, in which the image display unit may display the migration state of the gas as the three-dimensional information.

With the above configuration, the three-dimensional migration state of the gas can be predicted, and it is possible to consider whether or not a person can approach while enhancing safety.

(12) An estimation model generation device according to one aspect of the present disclosure includes: an image input unit that receives, as an input, a gas distribution moving image including a plurality of frames and in which a presence range of gas leaked into a space is indicated as a gas region; a velocity input unit that receives, as an input, a migration state of gas in a distal-proximal direction in the gas distribution moving image; and a machine learning unit that performs machine learning using a combination of the gas distribution moving image and the migration state of the gas in the distal-proximal direction as training data, and generates an estimation model that outputs the migration state of the gas in the distal-proximal direction using the gas distribution moving image as an input.

Furthermore, an estimation model generation method according to one aspect of the present disclosure includes: receiving, as an input, a gas distribution moving image including a plurality of frames and in which a presence range of gas leaked into a space is indicated as a gas region; receiving, as an input, a migration state of gas in a distal-proximal direction in the gas distribution moving image; and performing machine learning using a combination of the gas distribution moving image and the migration state of the gas in the distal-proximal direction as training data, and generating an estimation model that outputs the migration state of the gas in the distal-proximal direction using the gas distribution moving image as an input.

Furthermore, a program according to one aspect of the present disclosure is a program causing a computer to perform estimation model generation processing, the estimation model generation processing including: receiving, as an input, a gas distribution moving image including a plurality of frames and in which a presence range of gas leaked into a space is indicated as a gas region; receiving, as an input, a migration state of gas in a distal-proximal direction in the gas distribution moving image; and performing machine learning using a combination of the gas distribution moving image and the migration state of the gas in the distal-proximal direction as training data, and generating an estimation model that outputs the migration state of the gas in the distal-proximal direction using the gas distribution moving image as an input.

With the estimation model generation device, the estimation model generation method, and the program according to one aspect of the present disclosure, the migration state of the gas in the distal-proximal direction is estimated on the basis of the feature of the gas region in the gas distribution moving image. Therefore, by appropriately designing training data, it is possible to generate an estimation model identifying whether the gas is approaching or moving away with respect to an imaging position.

(13) A gas migration estimation device according to one aspect of the present disclosure includes: an image input unit that receives, as an input, a gas distribution moving image including a plurality of frames and in which a presence range of gas leaked into a space is indicated as a gas region; a machine learning unit performs machine learning using a combination of a training gas distribution moving image and a migration state of gas in a distal-proximal direction in the training gas distribution moving image as training data and generates an estimation model; and a gas migration estimation unit that estimates a migration state of gas in a distal-proximal direction corresponding to the gas distribution moving image received by the image acquisition unit, by using the estimation model.

Furthermore, a gas migration estimation method according to one aspect of the present disclosure includes: receiving, as an input, a gas distribution moving image including a plurality of frames and in which a presence range of gas leaked into a space is indicated as a gas region; generating an estimation model by performing machine learning using a combination of a training gas distribution moving image and a migration state of gas in a distal-proximal direction in the training gas distribution moving image as training data; and estimating a migration state of gas in a distal-proximal direction corresponding to the gas distribution moving image received by using the estimation model.

Furthermore, a program according to one aspect of the present disclosure is a program causing a computer to perform gas migration estimation processing, the gas migration estimation processing including: receiving, as an input, a gas distribution moving image including a plurality of frames and in which a presence range of gas leaked into a space is indicated as a gas region; and generating an estimation model by performing machine learning using a combination of a training gas distribution moving image and a migration state of gas in a distal-proximal direction in the training gas distribution moving image as training data; and estimating a migration state of gas in a distal-proximal direction corresponding to the gas distribution moving image received by using the estimation model.

With the estimation model generation device, the estimation model generation method, and the program according to one aspect of the present disclosure, the migration state of the gas in the distal-proximal direction is estimated on the basis of the feature of the gas region in the gas distribution moving image. Therefore, by appropriately designing training data, it is possible to perform identification by generating an estimation model identifying whether the gas is approaching or moving away with respect to an imaging position.

INDUSTRIAL APPLICABILITY

A gas leakage position identification device, a gas leakage position identification method, and a program according to the present disclosure can estimate a gas migration state from an image obtained by capturing an image from one viewpoint, and are useful as a system for allowing a person to safely investigate and work on a site.

REFERENCE SIGNS LIST

100, 101, 200 Gas sensing system
10 Image generation unit
20, 41, 42 Gas sensing device
201 Image acquisition unit
211 Gas region moving image extraction unit
212 Gas region moving image acquisition unit
213 Distal-proximal direction velocity acquisition unit
214, 224 Distal-proximal direction velocity estimation unit
2141 Machine learning unit
2142 Learning model holding unit
215 Determination result output unit
271 Screen direction velocity estimation unit
275 Velocity synthesis unit
21, 26, 27 Gas velocity estimation device
24 Display unit
30 Learning data creation device

The invention claimed is:

1. A gas migration estimation device comprising:
an image inputter that receives, as an input, a gas distribution moving image including a plurality of frames and in which a presence range of gas leaked into a space is indicated as a gas region; and
a gas migration estimator that estimates a migration state of gas in a distal-proximal direction corresponding to the gas distribution moving image received by a hardware processor, by using an estimation model that is machine-learned using a combination of a training gas distribution moving image and a migration state of gas in a distal-proximal direction in the training gas distribution moving image as training data, to determine whether or not the gas is flowing in the distal-proximal direction, which is a depth direction of the gas distribution moving image.

2. The gas migration estimation device according to claim 1, wherein the gas migration estimator uses a relative distal-proximal velocity indicating a migration velocity of the gas in the distal-proximal direction as a relative value with respect to a migration velocity in a viewing angle direction, as the migration state of the gas in the distal-proximal direction in the training data.

3. The gas migration estimation device according to claim 1, wherein the gas migration estimator outputs a migration velocity of the gas in the distal-proximal direction in the gas distribution moving image received by the image inputter as the migration state of the gas in the distal-proximal direction.

4. The gas migration estimation device according to claim 1, wherein the gas migration estimator outputs a probability distribution of a migration velocity of the gas in the distal-proximal direction in the gas distribution moving image received by the image inputter as the migration state of the gas in the distal-proximal direction.

5. The gas migration estimation device according to claim 1, wherein the image inputter includes an imaging means that senses infrared light, and the gas region is an image of gas that absorbs the infrared light, or water vapor.

6. The gas migration estimation device according to claim 1, wherein the image inputter includes an imaging means that senses visible light, and the gas region is an image of gas that absorbs the visible light, or water vapor.

7. The gas migration estimation device according to claim 1, wherein the image inputter receives, as an input, a gas distribution moving image obtained by extracting a specific frequency component from a moving image obtained by imaging a space.

8. The gas migration estimation device according to claim 1, further comprising an image display that superimposes and displays the migration state of the gas in the distal-proximal direction on the gas distribution moving image received by the image inputter.

9. The gas migration estimation device according to claim 8, wherein the image display displays at least one of presence or absence of migration of the gas in the distal-proximal direction, a migration direction, and a migration velocity by color.

10. The gas migration estimation device according to claim 8, wherein the image display displays at least one of presence or absence of migration of the gas in the distal-proximal direction, a migration direction, and a migration velocity by a length of a line or an arrow.

11. The gas migration estimation device according to claim 8, further comprising a three-dimensional flow estimator that estimates a migration state of gas in a viewing angle direction in the gas distribution moving image received by the image inputter, and estimates a migration state of gas as three-dimensional information from the migration state of the gas in the viewing angle direction and the migration state of the gas in the distal-proximal direction, wherein the image display displays the migration state of the gas as the three-dimensional information.

12. An estimation model generation device comprising:

an image inputter that receives, as an input, a gas distribution moving image including a plurality of frames and in which a presence range of gas leaked into a space is indicated as a gas region;

a velocity inputter that receives, as an input, a migration state of gas in a distal-proximal direction in the gas distribution moving image; and a hardware processor that performs machine learning using a combination of the gas distribution moving image and the migration state of the gas in the distal-proximal direction as training data, and generates an estimation model that outputs the migration state of the gas in the distal-proximal direction using the gas distribution moving image as an input, to indicate whether or not the gas is flowing in the distal-proximal direction, which is a depth direction of the gas distribution moving image.

13. A gas migration estimation device comprising:

an image inputter that receives, as an input, a gas distribution moving image including a plurality of frames and in which a presence range of gas leaked into a space is indicated as a gas region;

a second hardware processor that performs machine learning using a combination of a training gas distribution moving image and a migration state of gas in a distal-proximal direction in the training gas distribution moving image as training data and that generates an estimation model; and a gas migration estimator that estimates a migration state of gas in a distal-proximal direction corresponding to the gas distribution moving image received by a first hardware processor, by using the estimation model, to determine whether or not the gas is flowing in the distal-proximal direction, which is a depth direction of the gas distribution moving image.

14. A gas migration estimation method comprising:

receiving, as an input, a gas distribution moving image including a plurality of frames and in which a presence range of gas leaked into a space is indicated as a gas region; and estimating a migration state of gas in a distal-proximal direction corresponding to the gas distribution moving image received by using an estimation model that is machine-learned using a combination of a training gas distribution moving image and a migration state of gas in a distal-proximal direction in the training gas distribution moving image as training data, to determine whether or not the gas is flowing in the distal-proximal direction, which is a depth direction of the gas distribution moving image.

15. A non-transitory recording medium storing a computer readable program causing a computer to perform gas migration estimation processing, the gas migration estimation processing comprising:

receiving, as an input, a gas distribution moving image including a plurality of frames and in which a presence range of gas leaked into a space is indicated as a gas region; and estimating a migration state of gas in a distal-proximal direction corresponding to the gas distribution moving image received by using an estimation model that is machine-learned using a combination of a training gas distribution moving image and a migration state of gas in a distal-proximal direction in the training gas distribution moving image as training data, to determine whether or not the gas is flowing in the distal-proximal direction, which is a depth direction of the gas distribution moving image.

16. An estimation model generation method comprising:

receiving, as an input, a gas distribution moving image including a plurality of frames and in which a presence range of gas leaked into a space is indicated as a gas region;

receiving, as an input, a migration state of gas in a distal-proximal direction in the gas distribution moving image; and performing machine learning using a combination of the gas distribution moving image and the migration state of the gas in the distal-proximal direction as training data, and generating an estimation model that outputs the migration state of the gas in the distal-proximal direction using the gas distribution moving image as an input, to indicate whether or not the gas is flowing in the distal-proximal direction, which is a depth direction of the gas distribution moving image.

17. A non-transitory recording medium storing a computer readable program causing a computer to perform estimation model generation processing, the estimation model generation processing comprising:

receiving, as an input, a gas distribution moving image including a plurality of frames and in which a presence range of gas leaked into a space is indicated as a gas region;

receiving, as an input, a migration state of gas in a distal-proximal direction in the gas distribution moving image; and performing machine learning using a combination of the gas distribution moving image and the migration state of the gas in the distal-proximal direction as training data, and generating an estimation model that outputs the migration state of the gas in the distal-proximal direction using the gas distribution moving image as an input, to indicate whether or not the gas is flowing in the distal-proximal direction, which is a depth direction of the gas distribution moving image.

18. A gas migration estimation method comprising:

receiving, as an input, a gas distribution moving image including a plurality of frames and in which a presence range of gas leaked into a space is indicated as a gas region;

generating an estimation model by performing machine learning using a combination of a training gas distribution moving image and a migration state of gas in a distal-proximal direction in the training gas distribution moving image as training data; and estimating a migration state of gas in a distal-proximal direction corresponding to the gas distribution moving image received by using the estimation model, to determine whether or not the gas is flowing in the distal-proximal direction, which is a depth direction of the gas distribution moving image.

19. A non-transitory recording medium storing a computer readable program causing a computer to perform gas migration estimation processing, the gas migration estimation processing comprising:

receiving, as an input, a gas distribution moving image including a plurality of frames and in which a presence range of gas leaked into a space is indicated as a gas region;

generating an estimation model by performing machine learning using a combination of a training gas distribution moving image and a migration state of gas in a distal-proximal direction in the training gas distribution moving image as training data; and estimating a migration state of gas in a distal-proximal direction corresponding to the gas distribution moving image received by using the estimation model, to determine whether or not the gas is flowing in the distal-proximal direction, which is a depth direction of the gas distribution moving image.

20. The gas migration estimation device according to claim 2, wherein the gas migration estimator outputs a migration velocity of the gas in the distal-proximal direction in the gas distribution moving image received by the image inputter as the migration state of the gas in the distal-proximal direction.

21. The gas migration estimation device according to claim 1, wherein the image inputter receives, as the input, the gas distribution moving image including the plurality of frames, which are all obtained from a single viewpoint.

* * * * *